(12) United States Patent
Wang et al.

(10) Patent No.: US 10,560,687 B2
(45) Date of Patent: Feb. 11, 2020

(54) LED-BASED INTEGRAL IMAGING DISPLAY SYSTEM AS WELL AS ITS CONTROL METHOD AND DEVICE

(71) Applicant: Jilin University, Changchun (CN)

(72) Inventors: Shigang Wang, Changchun (CN); Wei Wu, Changchun (CN); Jian Wei, Changchun (CN); Yan Zhao, Changchun (CN); Meilan Piao, Changchun (CN); Tianshu Li, Changchun (CN); Henan Li, Changchun (CN); Lizhong Zhang, Changchun (CN); Bowen Jia, Changchun (CN)

(73) Assignee: Jilin University, Changchun (CN)

( * ) Notice: Subject to any disclaimer, the term of this patent is extended or adjusted under 35 U.S.C. 154(b) by 37 days.

(21) Appl. No.: 15/978,581

(22) Filed: May 14, 2018

(65) Prior Publication Data

US 2018/0338137 A1    Nov. 22, 2018

(30) Foreign Application Priority Data

May 22, 2017   (CN) .......................... 2017 1 0361011

(51) Int. Cl.
*H04N 13/322* (2018.01)
*H04N 13/111* (2018.01)
*G09G 3/32* (2016.01)
*G02B 27/09* (2006.01)
*H04N 13/243* (2018.01)
*H04N 13/307* (2018.01)
*G02B 27/22* (2018.01)
*G02B 27/00* (2006.01)
*H04N 13/00* (2018.01)

(52) U.S. Cl.
CPC ....... *H04N 13/322* (2018.05); *G02B 27/0075* (2013.01); *G02B 27/0955* (2013.01); *G02B 27/2214* (2013.01); *G09G 3/32* (2013.01); *H04N 13/111* (2018.05); *H04N 13/243* (2018.05); *H04N 13/307* (2018.05); *H04N 2013/0081* (2013.01)

(58) Field of Classification Search
None
See application file for complete search history.

(56) References Cited

U.S. PATENT DOCUMENTS

2012/0293492 A1*  11/2012  Kuroume  ............. H04N 13/167
                                                   345/419
2014/0146388 A1*   5/2014  Kautz   ................ G02B 27/2214
                                                   359/463

* cited by examiner

*Primary Examiner* — Michelle Chin
(74) *Attorney, Agent, or Firm* — Maier & Maier, PLLC

(57) ABSTRACT

A LED-based integral imaging display system as well as its control method and device, including: a parameter matching step: matching the parameters of the lenslet array and LED in the display part of said LED-based integral imaging display system to obtain the display parameters. The display parameters include the basic parameters of the display part, and the corresponding optical imaging models, which match with the basic parameters, in different stereoscopic display modes. A video source acquisition step: according to the display parameters, acquiring the integral imaging video sources required by LED-based integral imaging naked-eye stereoscopic display, which is used for the to-be-displayed 3D image.

16 Claims, 7 Drawing Sheets

LED-BASED INTEGRAL IMAGING DISPLAY SYSTEM AS WELL AS ITS CONTROL METHOD AND DEVICE

The present application claims the priority of Chinese Patent Application NO. 201710361011.6, with the title "Integral-imaging high-density small-pitch LED display parameter design method", filed on May 22, 2017, the disclosure of which is incorporated by reference herein in its entirety.

FIELD

The present invention relates to the field of display technology, particularly to a LED-based integral imaging display system as well as its control method and device, and more particularly to an integral imaging display system based on a high-density small-pitch LED as well as its control method and device.

Specifically, the present invention relates to the autostereoscopic display technology, and more particularly to an integral imaging display system based on LED.

BACKGROUND

Completely reconstruct the nature scene is one of the human goals, several generations of scientists have worked hard for it. Samsung, LG, Sony, Sharp, Philips and other multinational companies have invested heavily in 3D display technique but the 3D visual effect of current product is poor. Due to the loss of the phase information carried by the wave light, it is impossible to achieve true 3D display. True 3D display is a new display technology which reconstructs the optical model of the original scene by superimposing the lights and the relative depth information of the real scene that was lost during the projection process was restored. The reconstructed 3D scene with true color, continuous parallax can be viewed by many people directly. It will lead the scientific visualization into a new aims which can be applied in the entertainment, medicine, military, production, life and other fields True 3D display technology includes: integral imaging, holographic and volumetric display. The holographic display has bottleneck in color video. The volumetric display needs the spherical or cylindrical protective cover which limited the display range. By contrast, in integral imaging, the acquisition and display is simple and the 3D information is point to point; it can reconstruct 3D image with true color and continuous parallax which is suitable to both static and dynamic scenes. The size of the elemental image is determined by the display device. If we use LED, the display can achieve any size which meets the most requirements of people.

With the development of technology, the pixel pitch of LED display is getting smaller and smaller which can be defined as high density as less than 1.5 mm (especially 1.25 mm). The present invention related to an integral imaging system based on high density small pitch LED and realized autostereoscopic display.

The inter-pixel pitch means the distance between two pixels on the display screen, which depends on the size and the resolution of the screen. If the size of screen is fixed, the higher the resolution is, the smaller the pitch is and the clearer the image is; when the resolution is fixed, the smaller the screen is, the smaller the pitch is and the clearer the image is.

SUMMARY

This invention aims to provide a LED-based integral imaging display system as well as its control method and device, to solve the problem that the LED-based integral imaging display has not been done so far.

Especially, the purpose of the present invention is to provide an integral imaging system based on high-density small-pitch LED and the elemental image arrays are generated according to the parameters of the display platform. It solve the problems of no methods for the parameters matching between lenslet array and LED display.

The present invention provides a control method of LED-based integral imaging display system, including: parameter matching step: matching the parameters of the lenslet array and LED in the display part of said LED-based integral imaging display system to obtain the display parameters; where, said display parameters consist of the basic parameters of said display part, and the corresponding optical imaging models, which match with said basic parameters, in different stereoscopic display modes; video source acquisition step: according to said display parameters, acquiring the integral imaging video sources required by LED-based integral imaging naked-eye stereoscopic display, which is used for the to-be-displayed 3D image.

Optionally, said parameter matching step includes: parameter determination step: determining the basic parameters of the display part; model establishing step: establishing the optical imaging models in different stereoscopic display modes based on said basic parameters; wherein, said basic parameters include: at least one of the shape, aperture, arrangement, focal length, refractive index, radius of curvature, height of the hemisphere, and number of pixels of each elemental lens in said lenslet array, and the pixel size of the LED display; the different display modes include: at least one of the real, virtual, and focused modes.

Optionally, said parameter determination step includes: determining the shape, arrangement, focal length, and refractive index of said elemental lens; based on the shape, arrangement, focal length, and refractive index of said elemental lens, determining radius of curvature of said elemental lens; determining the aperture of said elemental lens and/or the pixel size of said LED display; when the radius of curvature of said elemental lens is determined, determining the height of the base of the elemental lens template that said elemental lens belongs to according to the radius of curvature and aperture of said elemental lens; determining the number of pixels in said elemental lens according to the aperture of said elemental lens and the pixel size of said LED display; wherein, the shape of said elemental lens includes: square; the arrangement of said elemental lenses includes: array arrangement; the pixel size of said LED display includes: the pixel pitch of said LED display is less than 1.5 mm (especially 1.25 mm); said elemental lens includes: plano-convex lens circumscribing a circular hole.

Optionally, model establishing step includes: obtaining the distance between said LED display and said lenslet array; if the distance between said LED display and said lenslet array is larger than the focal length of said elemental lens, establishing the optical imaging model in real mode; if the distance between said LED display and said lenslet array is smaller than the focal length of said elemental lens, establishing the optical imaging model in virtual mode; if the distance between said LED display and said lenslet array is equal to the focal length of said elemental lens, establishing the optical imaging model in focused mode; determining the resolution, viewing angle, and depth of the 3D image in the optical imaging models in different stereoscopic display modes, according to the distance between said LED display and said lenslet array, said basic parameters, and the image distance in the optical imaging models in different stereoscopic display modes.

Optionally, the determination of the resolution, viewing angle, and depth of the 3D image in the optical imaging models in different stereoscopic display modes includes: determining the resolution of the 3D image in the optical imaging model in said real mode or said virtual mode, according to the distance between said LED display and said lenslet array, the pixel size of said LED display, and the image distance of the 3D image in the optical imaging model in said real mode or said virtual mode; determining the viewing angle of the 3D image in the optical imaging models in different stereoscopic display modes, according to the aperture of said elemental lens and the distance between said LED display and said lenslet array; when the resolution of the 3D image in the optical imaging model in real or virtual mode is determined, determining the depth of the 3D image in the optical imaging model in real or virtual mode, according to the image distance and resolution of the 3D image in the optical imaging model in real or virtual mode, as well as the aperture of said elemental lens.

Optionally, the determination of the resolution, viewing angle, and depth of the 3D image in the optical imaging models in different stereoscopic display modes includes: determining the resolution of the 3D image in the optical imaging model in said focused mode, according to the aperture of said elemental lens; determining the depth of the 3D image in the optical imaging model in said focused mode, according to the separation distance, aperture, and pixel size.

Optionally, said video source acquisition step includes: virtual acquisition step and real acquisition step; wherein, said virtual acquisition step includes: according to said display parameters, simulating the optical acquisition system in the computer to establish a virtual camera array; generating the video sources of the integral imaging system by using each camera of the virtual camera array and based on the records using computer graphics technique and the 3D information of the virtual 3D object corresponding to the to-be-displayed 3D object; and said real acquisition step includes: establishing the real camera array in the real acquisition system, according to said display parameters; generating the images at different viewing angles of said to-be-displayed 3D object using each camera of the real camera array, and calculating their disparity maps of the images at said different viewing angles; reconstructing 3D points corresponding to said to-be-displayed 3D object, using the disparity maps of the images at different viewing angles; generating the elemental image array as said video sources of the integral imaging system, by back-projecting the 3D points.

Optionally, in said virtual acquisition step, the viewing angle of said virtual camera is determined according to the number of the virtual cameras, the interval between two adjacent virtual cameras in said virtual camera array, and the distance between the virtual 3D object and said virtual camera; the resolution of the virtual camera is consistent with the number of the pixels in the elemental lens of said lenslet array; and in said real acquisition step, the arrangement of the real camera array includes: arrangement with equal or non-equal intervals according to the intervals among the real cameras; parallel or converged arrangement set according to the way of capturing.

Optionally, calculating the disparity maps of the images at different viewing angles includes: for each pixel in one captured image, calculating the mean square error functions within a certain horizontal range relative to its horizontally neighboring images; selecting the shift with the minimum mean square error as the horizontal disparity of this pixel; then the horizontal disparity map of said image is obtained; for each pixel in one captured image, calculating the mean square error functions within a certain vertical range relative to its vertically neighboring images; selecting the shift with the minimum mean square error as the vertical disparity of this pixel; then the vertical disparity map of said image is obtained; and reconstructing 3D points of the to-be-displayed 3D object includes: determining the coordinates of said 3D point, according to the focal length of said real camera, the distance between the point and the leftmost real camera, the disparity maps of the images at different viewing angles, the distances between the imaging points of this point in different real cameras and the corresponding image centers of the real cameras; and generating the elemental image array includes: determining the positions of the imaging points of the to-be-displayed 3D object in said elemental lens, according to the coordinates of 3D point of the to-be-displayed 3D object, the center positions of the elemental lens in said lenslet array, and the focal length of said elemental lens; recording the colors of the 3D object projected within the imaging range of said elemental lens into the elemental image corresponding to the elemental lens; arranging all elemental images of said lenslet array into an array to obtain said elemental image array.

Corresponding to the above method, the present invention provides a control device for the LED-based integral imaging display system, including: parameter matching unit: matching the parameters of the lenslet array and LED in the display part of said LED-based integral imaging display system to obtain the display parameters; where, said display parameters consist of the basic parameters of said display part, and the corresponding optical imaging models, which match with said basic parameters, in different stereoscopic display modes; video source acquisition unit: according to said display parameters, acquiring the integral imaging video sources required by LED-based integral imaging naked-eye stereoscopic display, which is used for the to-be-displayed 3D image.

Optionally, said parameter matching unit includes: parameter determination module: determining the basic parameters of the display part; model establishing module: establishing the optical imaging models in different stereoscopic display modes based on said basic parameters; wherein, said basic parameters include: at least one of the shape, aperture, arrangement, focal length, refractive index, radius of curvature, height of the hemisphere, and number of pixels of each elemental lens in said lenslet array, and the pixel size of the LED display; the different display modes include: at least one of the real, virtual, and focused modes.

Optionally, said parameter determination module for determining the basic parameters of the display part includes: determining the shape, arrangement, focal length, and refractive index of said elemental lens; based on the shape, arrangement, focal length, and refractive index of said elemental lens, determining radius of curvature of said elemental lens; determining the aperture of said elemental lens and/or the pixel size of said LED display; when the radius of curvature of said elemental lens is determined, determining the height of the base of the elemental lens template that said elemental lens belongs to according to the radius of curvature and aperture of said elemental lens;

determining the number of pixels in said elemental lens according to the aperture of said elemental lens and the pixel size of said LED display; wherein, the shape of said elemental lens includes: square; the arrangement of said elemental lenses includes: array arrangement; the pixel size of said LED display includes: the pixel pitch of said LED display is less than 1.5 mm (especially 1.25 mm); said elemental lens includes: plano-convex lens circumscribing a circular hole.

Optionally, said model establishing module for establishing the optical imaging models in different stereoscopic display modes includes: obtaining the distance between said LED display and said lenslet array; if the distance between said LED display and said lens let array is larger than the focal length of said elemental lens, establishing the optical imaging model in real mode; if the distance between said LED display and said lenslet array is smaller than the focal length of said elemental lens, establishing the optical imaging model in virtual mode; if the distance between said LED display and said lenslet array is equal to the focal length of said elemental lens, establishing the optical imaging model in focused mode; determining the resolution, viewing angle, and depth of the 3D image in the optical imaging models in different stereoscopic display modes, according to the distance between said LED display and said lenslet array, said basic parameters, and the image distance in the optical imaging models in different stereoscopic display modes.

Optionally, said model establishing module for determining the resolution, viewing angle, and depth of the 3D image in the optical imaging models in different stereoscopic display modes includes: determining the resolution of the 3D image in the optical imaging model in said real mode or said virtual mode, according to the distance between said LED display and said lenslet array, the pixel size of said LED display, and the image distance of the 3D image in the optical imaging model in said real mode or said virtual mode; determining the viewing angle of the 3D image in the optical imaging models in different stereoscopic display modes, according to the aperture of said elemental lens and the distance between said LED display and said lenslet array; when the resolution of the 3D image in the optical imaging model in real or virtual mode is determined, determining the depth of the 3D image in the optical imaging model in real or virtual mode, according to the image distance and resolution of the 3D image in the optical imaging model in real or virtual mode, as well as the aperture of said elemental lens.

Optionally, said model establishing module for determining the resolution, viewing angle, and depth of the 3D image in the optical imaging models in different stereoscopic display modes includes: determining the resolution of the 3D image in the optical imaging model in said focused mode, according to the aperture of said elemental lens; determining the depth of the 3D image in the optical imaging model in said focused mode, according to the separation distance, aperture, and pixel size.

Optionally, said video source acquisition unit includes: virtual acquisition module and real acquisition module; wherein, said virtual acquisition module includes: according to said display parameters, simulating the optical acquisition system in the computer to establish a virtual camera array; generating the video sources of the integral imaging system by using each camera of the virtual camera array and based on the records using computer graphics technique and the 3D information of the virtual 3D object corresponding to the to-be-displayed 3D object; and said real acquisition module includes: establishing the real camera array in the real acquisition system, according to said display parameters; generating the images at different viewing angles of said to-be-displayed 3D object using each camera of the real camera array, and calculating their disparity maps of the images at said different viewing angles; reconstructing 3D points corresponding to said to-be-displayed 3D object, using the disparity maps of the images at different viewing angles; generating the elemental image array as said video sources of the integral imaging system, by back-projecting the 3D points.

Optionally, in said virtual acquisition module, the viewing angle of said virtual camera is determined according to the number of the virtual cameras, the interval between two adjacent virtual cameras in said virtual camera array, and the distance between the virtual 3D object and said virtual camera; the resolution of the virtual camera is consistent with the number of the pixels in the elemental lens of said lenslet array; and in said real acquisition module, the arrangement of the real camera array includes: arrangement with equal or non-equal intervals according to the intervals among the real cameras; parallel or converged arrangement set according to the way of capturing.

Optionally, said real acquisition module for calculating the disparity maps of the images at different viewing angles includes: for each pixel in one captured image, calculating the mean square error functions within a certain horizontal range relative to its horizontally neighboring images; selecting the shift with the minimum mean square error as the horizontal disparity of this pixel; then the horizontal disparity map of said image is obtained; for each pixel in one captured image, calculating the mean square error functions within a certain vertical range relative to its vertically neighboring images; selecting the shift with the minimum mean square error as the vertical disparity of this pixel; then the vertical disparity map of said image is obtained; and reconstructing 3D points of the to-be-displayed 3D object includes: determining the coordinates of said 3D point, according to the focal length of said real camera, the distance between the point and the leftmost real camera, the disparity maps of the images at different viewing angles, the distances between the imaging points of this point in different real cameras and the corresponding image centers of the real cameras; and generating the elemental image array includes: determining the positions of the imaging points of the to-be-displayed 3D object in said elemental lens, according to the coordinates of 3D point of the to-be-displayed 3D object, the center positions of the elemental lens in said lenslet array, and the focal length of said elemental lens; recording the colors of the 3D object projected within the imaging range of said elemental lens into the elemental image corresponding to the elemental lens; arranging all elemental images of said lenslet array into an array to obtain said elemental image array.

Corresponding to the above device, this invention additionally provides a LED-based integral imaging display system comprising the control device of said above LED-based integral imaging display system.

The solution of this invention can achieve naked-eye 3D display, by matching the parameters of the lenslet array and LED display, and generating the video sources (e.g. an elemental image array) for integral imaging according to the matched display parameters.

Further, the solution of this invention can achieve LED-based integral imaging display that has not been done by existing techniques, by matching the parameters of the lenslet array and LED display, and generating the integral imaging video sources for naked-eye 3D imaging according to the matched display parameters.

Further, the solution of this invention can yield outstanding naked-eye stereoscopic effect of the LED-based integral imaging display, by matching the parameters of the lenslet array and LED display, and using the generated video sources.

Further, the solution of this invention generates the video sources for integral imaging using multiple acquisition methods including real acquisition and virtual acquisition. The flexibility and reliability of the acquisition are beneficial to the stereoscopic effect and color brightness of the 3D display.

Further, the solution of this invention displays 3D images in multiple modes, which is beneficial to improving the effect and range of the stereoscopic display.

Thus, this invention matches the parameters of the lenslet array and LED display in the display part of the integral imaging system, and generates the video sources using the images of original 3D object in the acquisition part according to the matched display parameters. In this way, naked-eye stereoscopic display can be realized, which can achieve LED-based integral imaging display that has not been done by existing techniques, and yield outstanding effect of stereoscopic display with bright colors.

Additional features and advantages of this invention are explained in the following description, and in part will be clearer from the description or after implementing the invention.

Below, the technical solutions of the present invention are further described in detail with reference to the accompanying figures and embodiments.

With reference to the accompanying drawings, the reference numbers in the embodiments of the present invention are as follows:

1—LED display (e.g. high-density small-pitch LED display); 2—lenslet array; 3—elemental lens; 4—base; 5—center depth plane; 6—camera array (e.g. real or virtual camera array); 7—focus plane (e.g. real or virtual focal plane); 8—lens; 9—camera; 10—stereoscopic image; 11—elemental image; 12—3D object (e.g. 3D object, 3D scene, etc.); 13—computer; 14—server; 15—router; 16—controller (e.g. synchronization signal controller); 102—parameter matching unit; 104—video source acquisition unit.

DETAILED DESCRIPTION

To make the objectives, technical solutions, and advantages of the present invention clearer, the technical solution of the present invention will be described clearly and completely in the following in conjunction with the specific embodiments of the present invention and the accompanying drawings. Obviously, the described embodiments are only a part but not all of the embodiments of the present invention. Based on the embodiments of the present invention, all other embodiments obtained by a person with ordinary skills in the art and without creative efforts will fall within the protection scope of the present invention.

Figure 13:
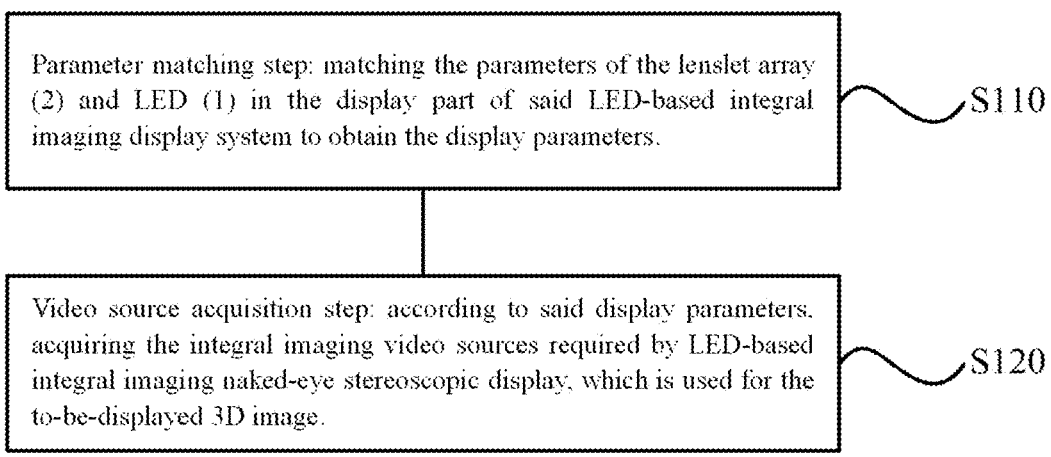
FIG. 13 is a flow chart, depicting an embodiment of the control method of the LED-based integral imaging display system according to the present invention.

A control method of LED-based integral imaging display system is disclosed according to the embodiments of the present invention. The flow chart of one embodiment is shown in FIG. 13. The control method includes: parameter matching step S110 and video source acquisition step S120. The details comprise:

Step S110, parameter matching: matching the parameters of the lenslet array 2 and LED display 1 in the display part of said LED-based integral imaging display system to obtain the display parameters. For example, matching the parameters of the lenslet array 2 and the high-density small-pitch LED display 1; where, said display parameters consist of the basic parameters of said display part, and the corresponding optical imaging models, which match with said basic parameters, in different stereoscopic display modes.

Figure 15:
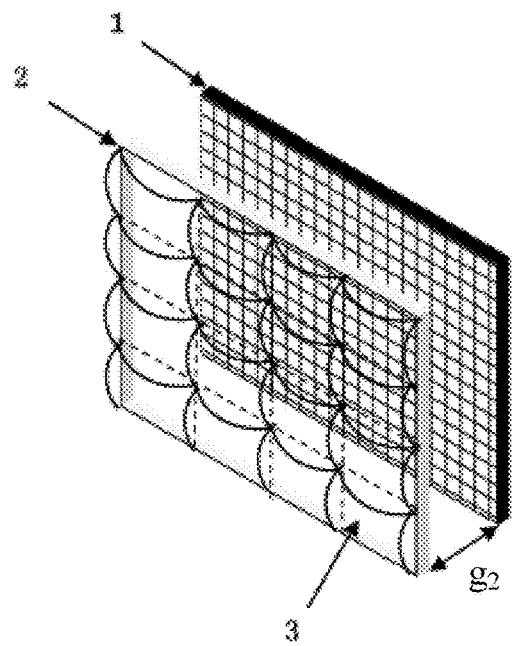
FIG. 15 is a structural schematic diagram, depicting an embodiment of the LED-based integral imaging display system (e.g. high-density small-pitch LED-based integral imaging display system) according to the present invention.

For example: referring to the example in FIG. 15, the high-density small-pitch LED-based integral imaging display system comprises: LED display (e.g. high-density small-pitch LED display) 1, lenslet array 2, and elemental lens 3. The distance between LED display 1 and lenslet array 2 is $g_2$.

In an optional example, said parameter matching step includes: parameter determination step and model establishing step. For example, parameter matching between the lenslet array 2 and the high-density small-pitch LED display 1 (which is the display parameter designing method of integral imaging display system with high-density small-pitch LED). Specifically:

Parameter determination step: determining the basic parameters of the display part; wherein, said basic parameters include: at least one of the shape, aperture, arrangement, focal length, refractive index, radius of curvature, height of the hemisphere, and number of pixels of each elemental lens 3 in said lenslet array 2, and the pixel size of the LED display 1.

For example, designing the basic parameters of elemental lens 3 in lenslet array 2, wherein the basic parameters include: shape, aperture, arrangement, focal length, refractive index, and radius of curvature.

Optionally, said parameter determination step includes determining the shape, arrangement, focal length, and refractive index of said elemental lens 3; based on the shape, arrangement, focal length, and refractive index of said elemental lens 3, determining radius of curvature of said elemental lens 3.

More optionally, the shape of said elemental lens 3 includes: at least one of square and circle.

More optionally, the arrangement of said elemental lenses 3 includes: array arrangement.

More optionally, said elemental lens 3 includes: at least one of plano-convex lens inscribed a circular hole and plano-convex lens circumscribing a circular hole.

Hereby, different display effects can be achieved by using different elemental lenses, which is more flexible and convenient.

Optionally, said parameter determination step also includes determining the aperture of said elemental lens 3 and/or the pixel size of said LED display 1; when the radius of curvature of said elemental lens 3 is determined, determining the height of the base 4 of the elemental lens template that said elemental lens belongs to (i.e. height of the hemisphere of said elemental lens 3) according to the radius of curvature and aperture of said elemental lens 3.

Figure 16:
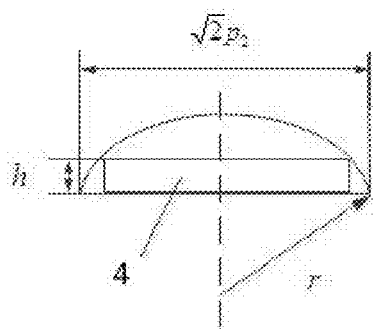
FIG. 16 is a structural schematic diagram in the front view (or structural design schematic diagram), depicting another embodiment of the template of the elemental lens in the LED-based integral imaging display system according to the present invention.
Figure 17:
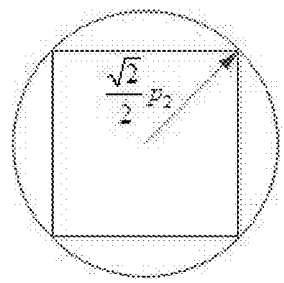
FIG. 17 is a structural schematic diagram in the bottom view (or another structural design schematic diagram), depicting another embodiment of the template of the elemental lens in the LED-based integral imaging display system according to the present invention.

For example, FIG. 16 and FIG. 17 are the structural schematic diagrams of the template of the elemental lens. Referring to the examples in FIG. 16 and FIG. 17, the template of the elemental lens may comprise: elemental lens 3 and base 4.

Let the shape of elemental lens 3 in lenslet array 2 be square, the arrangement be array arrangement, the aperture of single lens (e.g. elemental lens 3) be $p_2$, the focal length be f, and the refractive index be n, then the radius of curvature r and height of the hemisphere h are:

$$r = f(n-1) \qquad (1)$$

$$h = \sqrt{r^2 - \left(\frac{p_2}{2}\right)^2} - \sqrt{r^2 - \left(\frac{\sqrt{2}}{2}p_2\right)^2} \qquad (2\text{-}1)$$

Hereby, the radius of curvature and the height of the hemisphere are determined based on the set shape, arrangement, focal length, refractive index, and aperture. Therefore, the accurate and reliable template of the elemental lens can improve the accuracy and reliability of 3D display.

Optionally, said parameter determination step also includes determining the number of pixels in said elemental lens 3 according to the aperture of said elemental lens 3 and the pixel size of said LED display 1.

For example, let the pixel size of high-density small-pitch LED 1 be $\phi$, then the number of pixels contained in elemental lens 3 is:

$$N = \frac{p_2}{\phi} \qquad (3)$$

Hereby, the number of pixels in an elemental lens is determined according to the pixel size of the LED display, that makes matching between the LED and lenslet array more accurate to improve the display effect and the viewing experience of the viewers.

More optionally, the pixel size of said LED display 1 includes: the pixel pitch of said LED display 1 is less than 1.5 mm (especially 1.25 mm).

Therefore, the stereoscopic effect is more impressive and the image color is more bright, by using said LED display with the pixel pitch less than 1.5 mm (especially 1.25 mm).

Model establishing step: establishing the optical imaging models in different stereoscopic display modes based on said basic parameters; wherein, the different display modes include: at least one of the real, virtual, and focused modes.

For example, optical imaging models in different stereoscopic display modes are established according to the designed basic parameters of said elemental lens 3. The optical imaging models in different stereoscopic display modes include: optical imaging models in real mode, virtual mode, and focused modes.

Hereby, establishing optical imaging models in different stereoscopic display modes according to the basic parameters of elemental lens makes imaging of the to-be-displayed 3D object more flexible, more widely used, and more convenient.

Optionally, said model establishing step includes:

obtaining the distance between said LED display 1 and said lenslet array 2.

if the distance between said LED display 1 and said lenslet array 2 is larger than the focal length of said elemental lens 3, establishing the optical imaging model in real mode.

Figure 3:
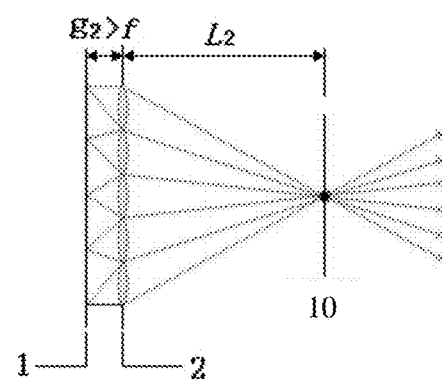
FIG. 3 is a stereoscopic display schematic diagram, depicting an embodiment of the real-mode 3D display of the LED-based integral imaging system according to the present invention.

For example, the stereoscopic display structural schematic diagram in real mode is shown in FIG. 3. Referring to the example in FIG. 3, the mode is real when the distance $g_2$ between LED display 1 and lenslet array 2 is larger than the focal length f of lenslet array 2. Here:

$$\frac{1}{f} = \frac{1}{g_2} + \frac{1}{L_2} \quad (4)$$

If the distance between said LED display 1 and said lenslet array 2 is smaller than the focal length of said elemental lens 3, establishing the optical imaging model in virtual mode.

Figure 4:
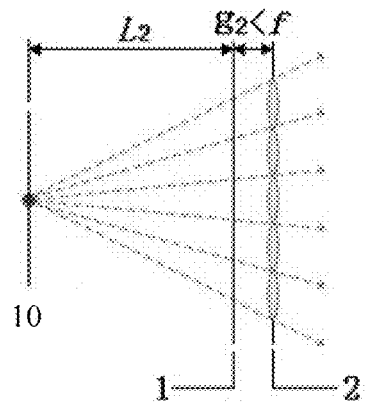
FIG. 4 is a stereoscopic display schematic diagram, depicting an embodiment of the virtual-mode 3D display of the LED-based integral imaging system according to the present invention.

For example, the stereoscopic display structural schematic diagram in virtual mode is shown in FIG. 4. Referring to the example in FIG. 4, the mode is virtual when the distance $g_2$ between LED display 1 and lenslet array 2 is smaller than the focal length f of lenslet array 2. Here:

$$\frac{1}{f} = \frac{1}{g_2} - \frac{1}{L_2} \quad (5)$$

Figure 5:
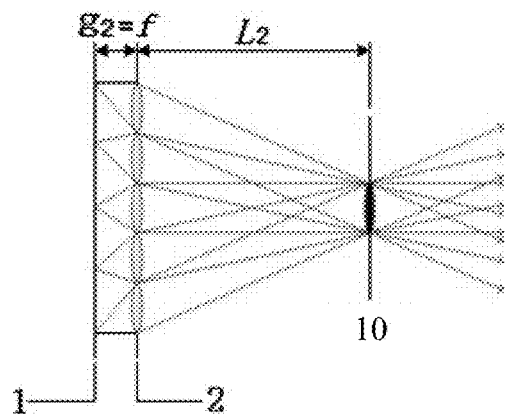
FIG. 5 is a stereoscopic display schematic diagram, depicting an embodiment of the focused-mode 3D display of the LED-based integral imaging system according to the present invention.

If the distance between said LED display 1 and said lenslet array 2 is equal to the focal length of said elemental lens 3, establishing the optical imaging model in focused mode;

For example, the stereoscopic display structural schematic diagram in focused mode is shown in FIG. 5. Referring to the example in FIG. 5, the mode is focused when the distance $g_2$ between LED display 1 and lenslet array 2 is equal to the focal length f of lenslet array 2. So the image distance of 3D image is $L_2 \approx \infty$.

Determining at least one of the resolution, viewing angle, and depth of the 3D image 10 in the optical imaging models in different stereoscopic display modes, according to the distance between said LED display 1 and said lenslet array 2, said basic parameters, and the image distance in the optical imaging models in different stereoscopic display modes.

Hereby, the stereoscopic display mode as well as one or more of the resolution, viewing angle and depth of the 3D image in the corresponding display mode are both determined, according to the relationship between the distance between the LED display and lenslet array and the focal length of the lenslet array, that enhances the accuracy and reliability of imaging of the to-be-displayed 3D object.

More optionally, the determination of at least one of the resolution, viewing angle, and depth of the 3D image 10 in the optical imaging models in different stereoscopic display modes includes: determining the resolution of the 3D image 10 in the optical imaging model in said real mode or said virtual mode, according to the distance between said LED display 1 and said lenslet array 2, the pixel size of said LED display 1, and the image distance of the 3D image 10 in the optical imaging model in said real mode or said virtual mode; or determining the resolution of the 3D image 10 in the optical imaging model in said focused mode, according to the aperture of said elemental lens 3.

More optionally, the determination of at least one of the resolution, viewing angle, and depth of the 3D image 10 in the optical imaging models in different stereoscopic display modes also includes: determining the viewing angle of the 3D image 10 in the optical imaging models in different stereoscopic display modes, according to the aperture of said elemental lens 3 and the distance between said LED display 1 and said lenslet array 2.

More optionally, the determination of at least one of the resolution, viewing angle, and depth of the 3D image 10 in the optical imaging models in different stereoscopic display modes also includes: when the resolution of the 3D image 10 in the optical imaging model in real or virtual mode is determined, determining the depth of the 3D image 10 in the optical imaging model in real or virtual mode, according to the image distance and resolution of the 3D image 10 in the optical imaging model in real or virtual mode, as well as the aperture of said elemental lens 3; or determining the depth of the 3D image 10 in the optical imaging model in said focused mode, according to the separation distance, aperture, and pixel size.

Figure 6:
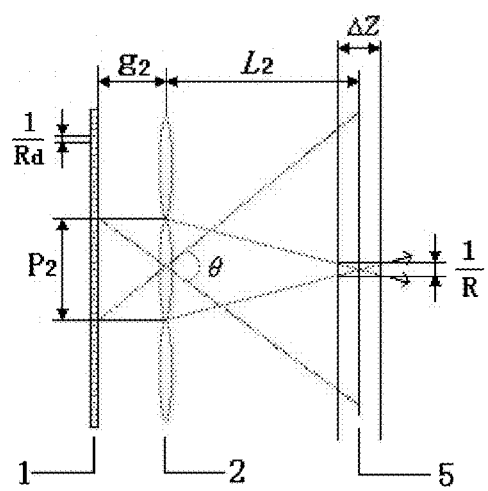
FIG. 6 is an optical design schematic diagram of an embodiment of the integral imaging display platform of the LED-based integral imaging system according to the present invention.

For example, the optical design schematic diagram of the integral imaging display platform is shown in FIG. 6. The light emitted from LED display 1 is focused on central depth plane 5 after being refracted by the lenslet array. The center of 3D image (e.g. 3D image 10) is on the central depth plane 5. In real mode (or, when the stereoscopic display mode is real or virtual), the resolution R, viewing angle θ, and depth ΔZ of the 3D image are:

$$R = \frac{g_2}{L_2 \phi} \quad (6)$$

$$\theta = 2\arctan\frac{P_2}{2g_2} \quad (7)$$

$$\Delta Z = 2\frac{L_2}{RP_2} \quad (8)$$

For example, referring to the example in FIG. 6, in virtual mode, the resolution, viewing angle, and depth of the 3D image are same as those in real mode.

For example, referring to the example in FIG. 6, in focused mode, the resolution R, viewing angle θ, and depth ΔZ of the 3D image are:

$$R = \frac{1}{P_2} \quad (9)$$

$$\theta = 2\arctan\frac{P_2}{2g_2} \quad (10)$$

$$\Delta Z = 2\frac{g_2}{\phi}P_2 \quad (11)$$

where $L_2$ is the image distance, $p_2$ is the aperture of elemental lens, and φ is the pixel size of LED in Equations 6, 7, 8, 9, 10, and 11.

Hereby, the display parameters can be accurately determined by determining one or more of the resolution, viewing angle, and depth in different stereoscopic display modes, which makes the acquisition of integral imaging video sources more convenient and more reliable.

Optionally, said model establishing step also includes: setting the focal length of the camera, the distance between lenses of the camera array, the disparities between adjacent elemental images, as well as the distance between the to-be-displayed 3D object and the cameras in the acquisition part of said LED-based integral imaging display system; according to geometrical optics, determining the distance between the lenslet array 2 and the LED display 1, the pitch between adjacent elemental lenses 3 in the lenslet array 2, the disparities between adjacent elemental images, and the distance between the elemental lens 3 and the to-be-displayed 3D image 10 in the display part of said LED-based integral imaging display system; obtaining the optical mapping model between the acquisition and display parts of said integral imaging display system.

For example, set the steps to establish the optical mapping model between the acquisition and display parts.

Figure 7A:
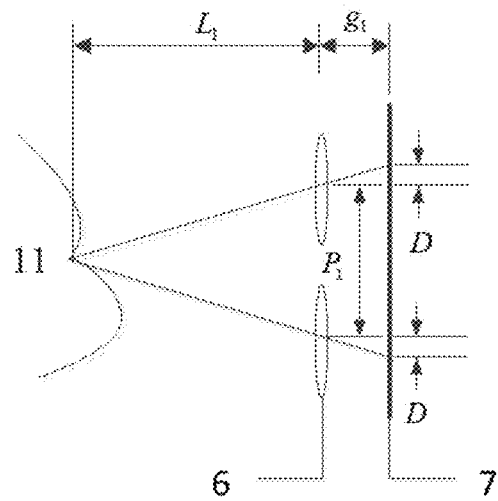
FIG. 7(a) is a schematic diagram of an embodiment of the optical mapping model between acquisition and display parts of the LED-based integral imaging system according to the present invention.
Figure 7B:
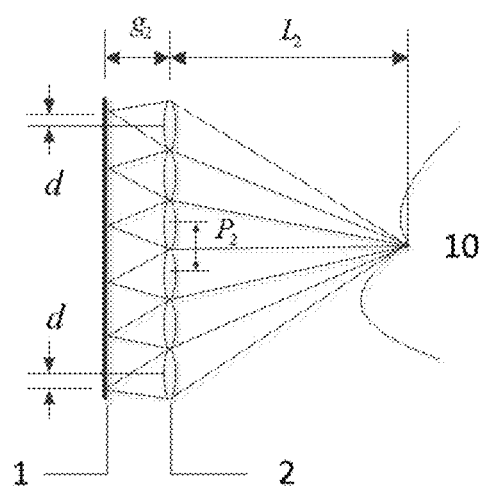
FIG. 7 (b) is a schematic diagram of another embodiment of the optical mapping model between acquisition and display parts of the LED-based integral imaging system according to the present invention.

The structural schematic diagrams of the optical mapping model between the acquisition and display parts are shown in FIG. 7(a) and FIG. 7(b). In the process of computer virtual acquisition, camera array 6 and focal plane 7 are both virtual; in the process of real acquisition, camera array 6 and focal plane 7 are both real.

step S120, video source acquisition: according to said display parameters, acquiring the integral imaging video sources required by LED-based integral imaging naked-eye stereoscopic display, which is used for the to-be-displayed 3D image; for example, acquiring the integral imaging video sources required by stereoscopic display according to the display parameters obtained after matching (e.g. elemental image array).

For example, the high-density small-pitch LED-based integral imaging display system matches the parameters of lenslet array 2 and LED display (e.g. high-density small-pitch LED display 1), and generates integral imaging video sources according to the display parameters after matching, which solves the problem that the LED-based integral imaging display has not been done so far.

For example, the high-density small-pitch LED-based integral imaging display system matches the parameters of the lenslet array and LED display to realize the LED-based integral imaging display using the integral imaging video sources generated by the display platform.

In the present invention, the problem of parameter (focal length and viewing angle) matching between the lenslet array and display platform is solved by jointly considering the resolution of the elemental image, and the depth and viewing angle of the 3D image. The optical matching models are also established to truly realize the integral imaging naked-eye 3D display on the LED screen.

Hereby, the integral imaging video source of the to-be-displayed 3D object is acquired by matching the parameters of the lenslet array and LED display according to the display parameters after matching, that realizes naked-eye 3D display with impressive display effect and bright colors.

In an optional example, said video source acquisition step includes: determining camera array step and capturing video sources step. Specifically:

determining camera array step: determining the camera array 6 according to said display parameters; wherein, said camera array 6 includes: virtual camera array or real camera array;

capturing video sources step: using each camera 9 in said camera array 6 to acquire the integral imaging video source for LED-based naked-eye stereoscopic display of the 3D object.

In an optional example, said capturing video sources step includes virtual acquisition step or real acquisition step.

For example, acquiring the integral imaging video sources required by stereoscopic display according to the display parameters obtained after matching (e.g. elemental image array) includes: virtual acquisition and real acquisition. Specifically:

said virtual acquisition step includes: according to said display parameters, simulating the optical acquisition system in the computer to establish a virtual camera array; generating the video sources of the integral imaging system by using each camera of the virtual camera array and based on the records using computer graphics technique and the 3D information of the virtual 3D object corresponding to the to-be-displayed 3D object.

Figure 8:
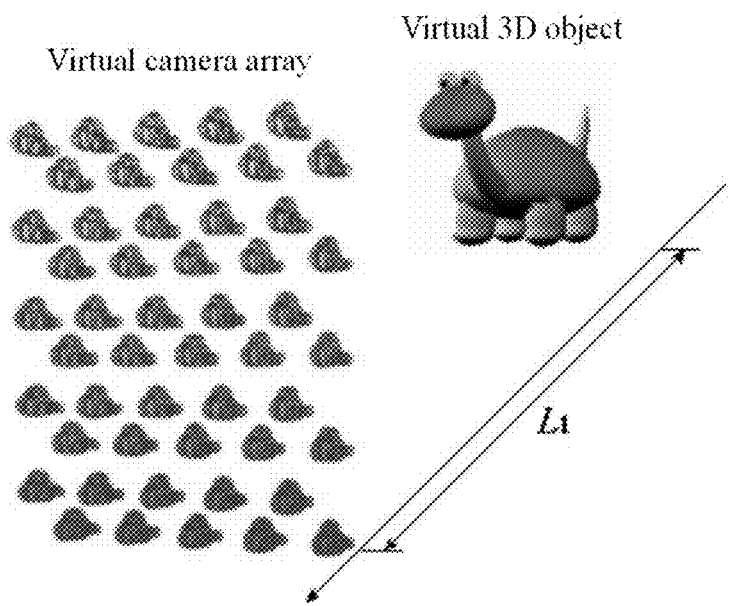
FIG. 8 is a schematic diagram, depicting an embodiment of the computer virtual acquisition system of the LED-based integral imaging system according to the present invention.

For example, the structural schematic diagram of the computer virtual acquisition is shown in FIG. 8. Referring to the example in FIG. 8, the process of virtual acquisition includes: using computer to simulate the optical acquisition system and recording 3D information of the virtual scene using computer graphics technique.

Optionally, in said virtual acquisition step, the viewing angle of said virtual camera is determined according to the number of the virtual cameras, the interval between two adjacent virtual cameras in said virtual camera array, and the distance between the virtual 3D object and said virtual camera.

For example, in the process of virtual acquisition, the viewing angle α, number M, and pitch $p_1$ of virtual camera satisfy:

$$\tan\frac{\alpha}{2} = \frac{MP_1}{2L_1} \quad (15)$$

Optionally, the resolution of said virtual camera is consistent with the number of the pixels in elemental lens 3 of said lenslet array 2.

For example, the resolution of virtual camera is consistent with the number of pixels in elemental lens 3 in the display part, that is N×N.

Hereby, the accuracy and reliability of virtual acquisition are improved according to one or more of the viewing angle, number, pitch, image distance, and resolution of virtual camera.

Said real acquisition step includes: establishing the real camera array in the real acquisition system, according to said display parameters; generating the images at different viewing angles of said to-be-displayed 3D object using each camera of the real camera array, and calculating their disparity maps of the images at said different viewing angles; reconstructing 3D points corresponding to said to-be-displayed 3D object, using the disparity maps of the images at different viewing angles; generating the elemental image array as said video sources of the integral imaging system, by back-projecting the 3D points.

For example, the process of real acquisition includes: acquiring images at different viewing angles by each camera in the real acquisition system; determining the coordinates of 3D points using the disparities; generating elemental images (e.g. elemental image 11) via back-projecting.

Figure 9:
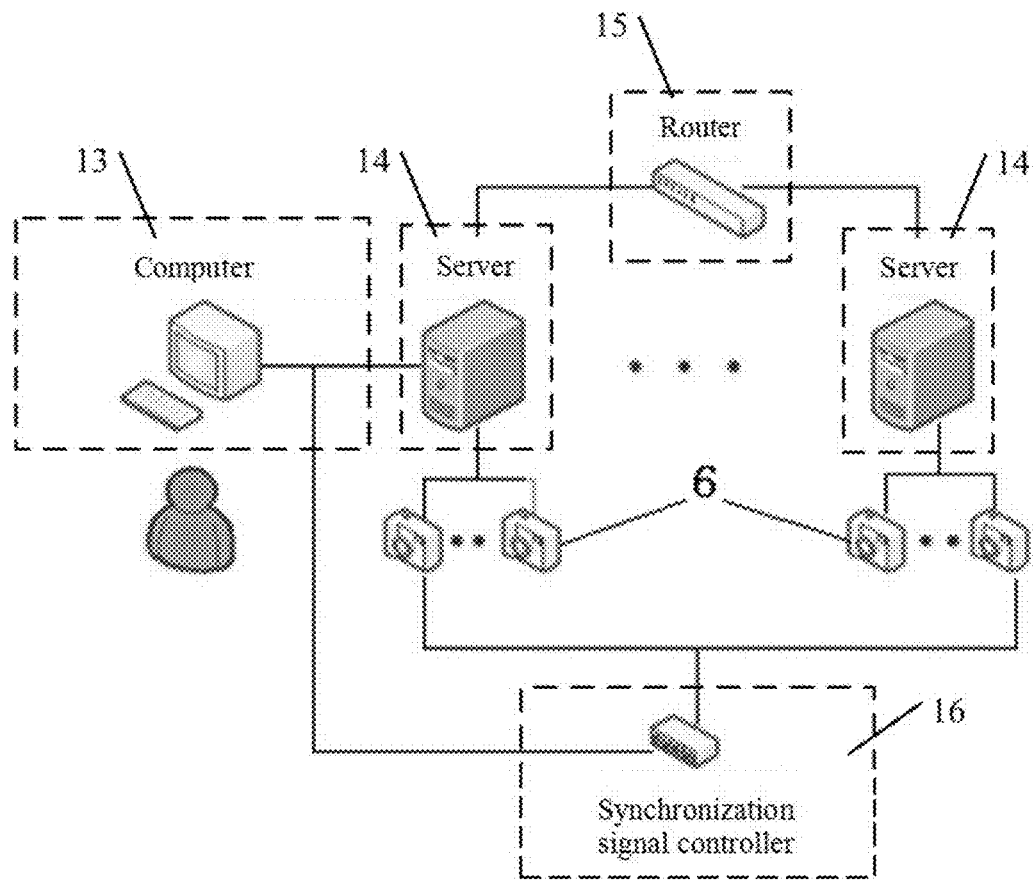
FIG. 9 is a schematic diagram, depicting an embodiment of the real acquisition system of the LED-based integral imaging system according to the present invention.

For example, the structural schematic diagram of the real acquisition system is shown in FIG. 9. Referring to the example in FIG. 9, the real acquisition system can include: camera array 6, computer 13, server 14, router 15, and synchronous signal controller 16. For example, said real acquisition system can also include: computer 13, server 14, router 15, and controller 16. Here, said server 14 and said controller 16 are connected with said real camera array; said router 15 is connected with said server 14; said controller 16 is connected with said computer 13.

Here, the computer 13 can be used to control the synchronous signal controller; the server 14 can be used for signal processing, and the synchronous signal controller 16 can be used to control synchronous acquisition of the camera array.

Hereby, by using virtual, real, and other acquisition modes, one can collect the 3D information of the to-bedisplayed 3D object more flexibly and more conveniently, and obtain more accurate and more reliable captured data.

Optionally, in the real acquisition, said arrangement of the real camera array includes: arrangement with equal or non-equal intervals according to the intervals among the real cameras; and/or parallel or converged arrangement set according to the way of capturing.

Figure 10:
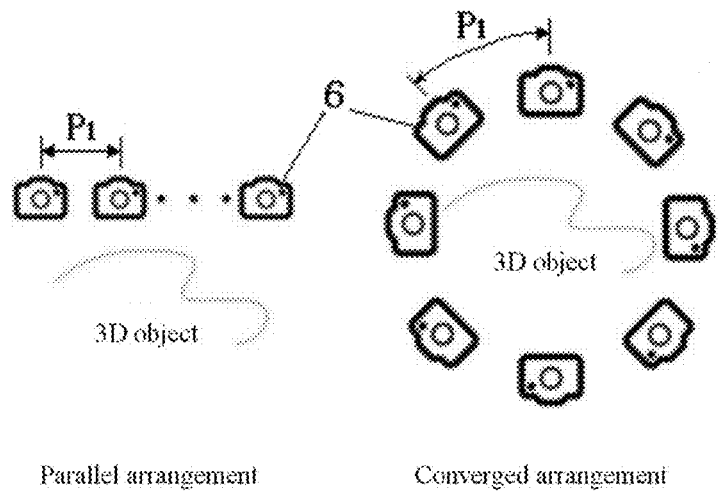
FIG. 10 is a structural schematic diagram, depicting an embodiment of the camera array arrangement of the LED-based integral imaging system according to the present invention.

For example, the structural schematic diagram of the camera array arrangement is shown in FIG. 10. Referring to the example in FIG. 10, in the process of real acquisition, the arrangement of the camera array 6 can be divided by equal-interval ($P_1=C$) arrangement and non-equal-interval ($P_1 \neq C$) arrangement according to the interval between adjacent cameras. It can also be divided by parallel arrangement and converged arrangement according to the way of capturing.

Hereby, the 3D information of the to-be-displayed 3D object can be collected by various means of camera array arrangement, which are more flexible, more convenient and more widely used.

Optionally, in said real acquisition step, calculating the disparity maps of the images at different viewing angles includes: for each pixel in one captured image, calculating the mean square error functions within a certain horizontal range relative to its horizontally neighboring images; selecting the shift with the minimum mean square error as the horizontal disparity of this pixel; then the horizontal disparity map of said image is obtained;

similarly, calculating the disparity maps of the images at different viewing angles includes: for each pixel in one captured image, calculating the mean square error functions within a certain vertical range relative to its vertically neighboring images; selecting the shift with the minimum mean square error as the vertical disparity of this pixel; then the vertical disparity map of said image is obtained.

For example, firstly the disparity maps between each captured image and its horizontally adjacent viewpoint images are calculated by:

$$MSE(m) = \frac{1}{T} \sum_{(k,l) \in I} [I_L(k,l) - I_R(k, l+m)]^2 \qquad (16)$$

And the pixel with the minimum MSE is determined as the matching pixel based on the above calculation, that is:

$$D = \min MSE(m) \qquad (17)$$

In Equations 16 and 17, $I_L$ is the left viewpoint image and $I_R$ is the right viewpoint image. k and l are the coordinates of the pixel. m is the shift of the pixel. T is the image width. D is the disparity.

Similarly, the disparity maps between vertical viewpoints can be calculated.

Hereby, the accuracy and reliability of disparity calculation are improved by considering the viewpoint images in different directions, thus improving the accuracy and reliability of the reconstruction of the to-be-displayed 3D object.

Optionally, in said real acquisition step, reconstructing 3D points of the to-be-displayed 3D object includes: determining the coordinates of said 3D point, according to the focal length of said real camera, the distance between the point and the leftmost real camera, the disparity maps of the images at different viewing angles, the distances between the imaging points of this point in different real cameras and the corresponding image centers of the real cameras.

Figure 11:
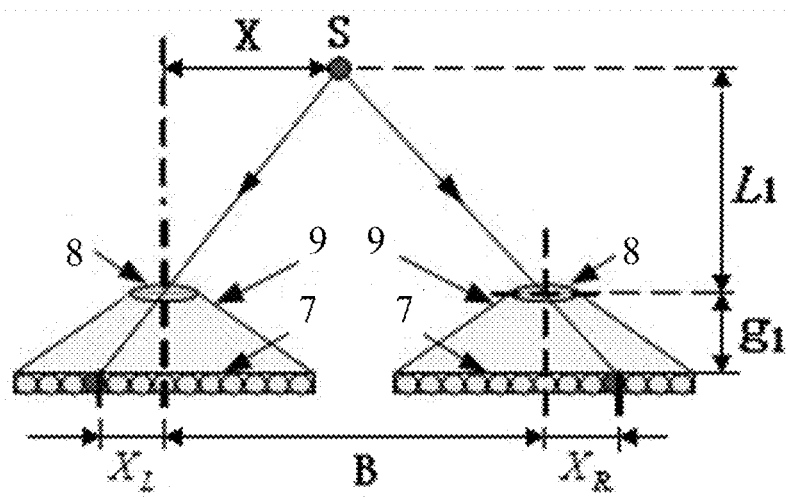
FIG. 11 is a schematic diagram of the spatial coordinates of an embodiment of the object reconstructed by the LED-based integral imaging system according to the present invention.

For example, to reconstruct the captured 3D object, an example is shown in FIG. 11. As shown in FIG. 11, the camera array 6 includes: two cameras (e.g. camera 9), such as the left camera and the right camera. Each camera includes: lens 8 and focal plane 7.

Let $L_1$ be the distance from the object point S to the camera, $g_1$ be the focal length of the camera, and D be the parallax, then:

$$L_1 = g_1 \times B/D \qquad (18)$$

$$D = X_L + X_R \qquad (21)$$

where $X_L$ and $X_R$ are the lateral distances of the projections of the object point S in the left and right views from the image centers, respectively. B is the distance between the centers of the left and right cameras.

In addition, let X and Y be the horizontal and vertical distances of the object point S relative to the center of the left camera, respectively. Then:

$$X = X_L \times B/D \qquad (19)$$

$$Y = Y_L \times B/D \qquad (20)$$

Hereby, by reconstructing 3D points of the to-be-displayed 3D object, the accuracy and reliability of the stereoscopic display can be improved.

Optionally, in said real acquisition step, generating the elemental image array includes:

determining the positions of the imaging points of the to-be-displayed 3D object in said elemental lens 3, according to the coordinates of 3D point of the to-be-displayed 3D object, the center positions of the elemental lens 3 in said lenslet array 2, and the focal length of said elemental lens 3; and then obtaining the imaging range of said elemental lens 3;

recording the colors of the 3D object projected within the imaging range of said elemental lens 3 into the elemental image 11 corresponding to the elemental lens 3; arranging all elemental images 11 of said lenslet array 2 into an array to obtain said elemental image array.

Figure 12:
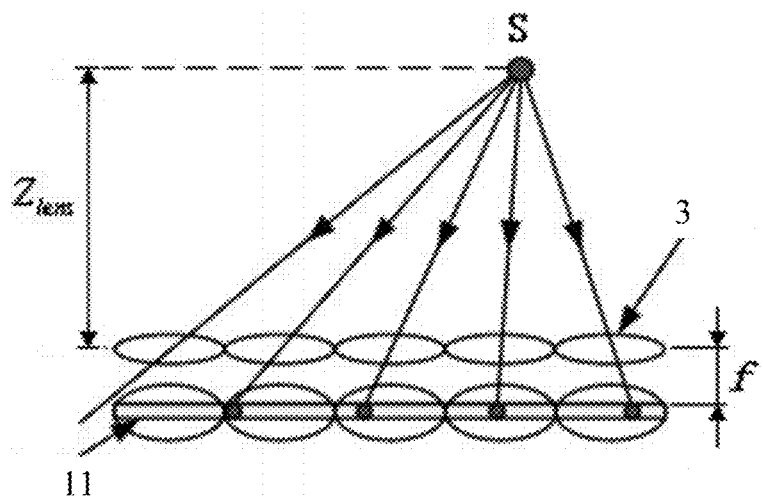
FIG. 12 is a schematic diagram of the principle of generating an embodiment of elemental image array via back-projecting using the LED-based integral imaging system according to the present invention.

For example: generating elemental image array via back-projecting:

When the projection of the object point is within the imaging range of the elemental lens 3, the color of this object point is recorded in the corresponding elemental image; when the projection of the object point is outside the imaging range of the elemental lens 3, this object point is discarded. As shown in FIG. 12, the imaging position of the object point S in one elemental lens is:

$$x = f \times (X - X_{lens})/(Z - Z_{lens}) \qquad (22)$$

$$y = f \times (Y - Y_{lens})/(Z - Z_{lens}) \qquad (23)$$

In Equations 22 and 23, x and y are the coordinates of the imaging point. X, Y, and Z are the coordinates of the object point S. $X_{lens}$, $Y_{lens}$, and $Z_{lens}$ are the coordinates of the center position of the elemental lens 3. The resolution of the elemental image is same as the number of pixels in the elemental lens 3 in the display part, i.e. N×N. N is a natural number.

X can be calculated according to Equation 19. Y can be calculated according to Equation 20. Z can be set as $L_1$ in FIG. 11.

Hereby, generating the elemental image array of the to-be-displayed 3D object by back-projecting the reconstructed points of this object is accurate and reliable, which can improve the stereoscopic display effect and color brightness.

An optional embodiment includes: a display step: said integral imaging video source is displayed on said LED display 1, that realizes the LED-based integral imaging naked-eye 3D display for said to-be-displayed 3D object.

Hereby, the integral imaging naked-eye 3D display is realized by displaying the integral imaging video source of the 3D object with convenience and good stereoscopic effect.

Through the verification by a large number of tests, using the technical solution of this embodiment, naked-eye stereoscopic display can be achieved by matching the parameters of the lenslet array and LED display and then generating the integral imaging video source required by stereoscopic display according to the display parameters obtained after matching (e.g. elemental image array).

Integral imaging display parameter design based on high density small pitch LED in the present invention, its preferred embodiment includes steps as follows:

1. Matching Parameters Between Lenslet Array 2 and High Density Small Pitch LED Display 1

The shape, aperture, arrangement, focal length, refractive index and radius of curvature of one elemental lens 3 in the lenslet array 2 are designed; establishing different optical imaging modular for autostereoscopic 3D display modes: real, virtual and focus which is as follows:

1.1. Design the Parameters of the Elemental Lens 3

The elemental lens 3 in lenslet array 2 is circular, rectangular packed. If the pitch is $P_2$, the focal length is f and the refractive index is n then the radius of curvature is $r=f(n-1)$ and the height of spherical segment is $$h = r - \sqrt{r^2 - \left(\frac{P_2}{2}\right)^2};$$

If the pixel size of the high density small pitch LED display 1 is $\phi$, then the number of pixels in one elemental lens 3 is $$N = \frac{P_2}{\phi}.$$

When the gap between high density small pitch LED display 1 and lenslet array 2 $g_2$ is greater than the focal length of the lenslet array 2, the 3D display mode is real and $$\frac{1}{f} = \frac{1}{g_2} + \frac{1}{L_2}.$$

In real mode the resolution R, viewing angle θ, and depth ΔZ of the 3D image are:

$$R = \frac{g_2}{L_2 \phi}, \theta = 2\arctan\frac{P_2}{2g_2}, \Delta Z = 2\frac{L_2}{RP_2};$$

When the gap between high density small pitch LED display 1 and lenslet array 2 $g_2$ is less than the focal length of the lenslet array 2, the 3D display mode is virtual and $$\frac{1}{f} = \frac{1}{g_2} - \frac{1}{L_2}.$$

In virtual mode the resolution R, viewing angle θ, and depth ΔZ of the 3D image are the same as real mode.

When the gap between high density small pitch LED display 1 and lenslet array 2 $g_2$ is equal to the focal length of the lenslet array 2, the 3D display mode is focus and the distance between lenslet array and the 3D image plane is $L_2 \approx \infty$. In focus mode the resolution R, viewing angle θ, and depth ΔZ of the 3D image are:

$$R = \frac{1}{P_2}, \theta = 2\arctan\frac{P_2}{2g_2}, \Delta Z = 2\frac{g_2}{\phi}P_2;$$

1.2 Establishing the Optical Mapping Model Between the Acquisition and Display Parts Assume the object distance, the camera focus, the interval between adjacent cameras, and the disparity between adjacent elemental images are L1, g1, P1, and D respectively. The image distance, the distance between the lenslet array 2 and the LED display 1, the pitch of the lenslet array 2, and the disparity between adjacent elemental images of the display end are L2, g2, P2, and d, and β is the amplify coefficient. The optical mapping relation between collecting and display will be:

$$\frac{L_1}{g_1} = \frac{P_1}{D}, \frac{L_2}{g_2} = \frac{P_2}{d}, \frac{D}{d} = \beta$$

1.3 Ture 3D Video Acquisition

Ture 3D video acquisition includes computer generated and real shoot;

1.3.1 In computer generated progress, the viewing angle and amount of the virtual camera are α and M, the camera pitch satisfy $$\tan\frac{\alpha}{2} = \frac{MP_1}{2L_1}$$

and the resolution of each camera is N×N which is consistent with the number of pixels included in the elemental lens in display.

1.3.2 The real shoot is divided into equal and non-equal interval $P_1=C$ and $P_1 \neq C$ (C is constant) according to the camera pith; parallel and converge shooting according to shooting mode which includes:

1.3.2.1 Calculating the parallax between each captured image and it's horizontally adjacent view image $$MSE(m) = \frac{1}{T}\sum_{(k,l)\in I}[I_L(k, l) - I_R(k, l+m)]^2.$$

The point where the mean square error is the smallest is determined as the matching point D=min MSE(m).

Where $I_L$, $I_R$ are the left and right view image; k,l are the coordinate of the pixel in the view image, m is the pixel shift distance, T is the width of the view image, D is the parallax; the same can be obtained for the vertical parallax.

1.3.2.2 Reconstruct the Spatial Coordinates of the Object

The distance between the object S and the camera is $L_1$, the focal length of the camera is $g_1$ and the parallax is D, then $L_1 = g_1 \times B/D$, $D = X_L + X_R$, here $X_L$, $X_R$ are the horizontal distance between the imaging point of the object S in left and right view image, the horizontal and vertical distance from the center of the image to the object S are $X = X_L \times B/D$, $Y = Y_L \times B/D$;

1.3.2.3 Elemental Image Array Generation Based on Back Matching

When the object point is mapped within the imaging range of the elemental lens 3, the pixel value of the object point is recorded in the corresponding elemental image; when the object point is mapped outside the imaging range of the elemental lens 3, the object point is discarded. The imaging position of the object point S in a elemental lens is $$x = f \times (X - X_{lens})/(Z - Z_{lens})$$

$$y = f \times (Y - Y_{lens})/(Z - Z_{lens})$$

Wherein x, y are the coordinates of the imaging point; X, Y, Z are the spatial coordinate of the object point S, $X_{lens}$, $Y_{lens}$, $Z_{lens}$, lens denotes the center coordinates of the elemental lens 3, the resolution of the elemental image is N×N which is consistent with the number of pixels included in the elemental lens 3 in display.

The positive effect of the present invention is to provide an integral imaging system based on high density small pitch LED and the elemental image arrays are generated according to the parameters of the display platform. It solves the problems of no methods for the parameters matching between lenslet array and LED display.

The preferred embodiment of the present invention will now be described in detail with reference to the accompanying drawings.

Figure 1:
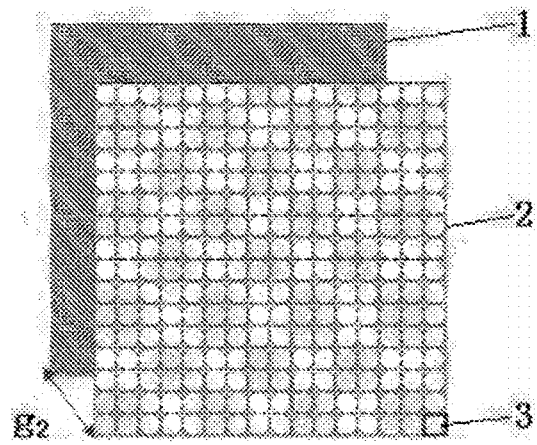
FIG. 1 is a schematic diagram of the principle of the integral imaging display system based on high density small pitch LED.

FIG. 1 is the principle of integral imaging display system based on high density small pitch LED. Where 1 is the high density small pitch LED display, 2 is the lenslet array and 3 is the elemental lens.

Figure 2:
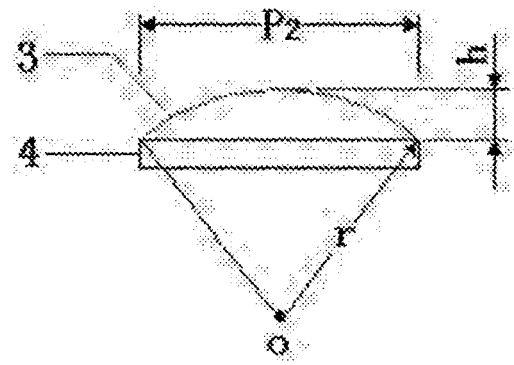
FIG. 2 is a design schematic diagram of the elemental lens template.

FIG. 2 is the design of the elemental lens template. Where 3 is the elemental lens and 4 is the base.

The elemental lens 3 in lenslet array 2 is circular, array arrangement. If the pitch is $P_2$, the focal length is f and the refractive index is n then the radius of curvature and the height of spherical segment are $$r = f(n-1) \quad \backslash* \ MERGEFORMAT \qquad (1)$$

$$h = r - \sqrt{r^2 - \left(\frac{P_2}{2}\right)^2} \quad \backslash* \ MERGEFORMAT \qquad (2\text{-}2)$$

If the pixel size of the high density small pitch LED display 1 is $\phi$, then the number of pixels in one elemental lens 3 is $$N = \frac{P_2}{\phi} \quad \backslash* \ MERGEFORMAT \qquad (3)$$

FIG. 3 is the real 3D display mode. When the gap between high density small pitch LED display 1 and lenslet array 2 $g_2$ is greater than the focal length of the lenslet array 2, the 3D display mode is real, then $$\frac{1}{f} = \frac{1}{g_2} + \frac{1}{L_2} \quad \backslash* \ MERGEFORMAT \qquad (4)$$

FIG. 4 is the virtual 3D display mode. When the gap between high density small pitch LED display 1 and lenslet array 2 $g_2$ is less than the focal length of the lenslet array 2, the 3D display mode is virtual, then $$\frac{1}{f} = \frac{1}{g_2} - \frac{1}{L_2} \quad \backslash* \ MERGEFORMAT \qquad (5)$$

FIG. 5 is the focus 3D display mode. When the gap between high density small pitch LED display 1 and lenslet array 2 $g_2$ is equal to the focal length of the lenslet array 2, the 3D display mode is focus and the distance between lenslet array and the 3D image plane is $L_2 \approx \infty$.

FIG. 6 is the optical design of the integral imaging display platform, where 5 is the central depth plane. The lights coming from the LED are converged on the central depth plane after the refraction of the lens. The central of the 3D image is on the central depth plane. Whether in real or virtual 3D display mode, the resolution, viewing angle and depth are:

$$R = \frac{g_2}{L_2 \phi} \quad \backslash* \ MERGEFORMAT \qquad (6)$$

$$\theta = 2\arctan\frac{P_2}{2g_2} \quad \backslash* \ MERGEFORMAT \qquad (7)$$

$$\Delta Z = 2\frac{L_2}{RP_2} \quad \backslash* \ MERGEFORMAT \qquad (8)$$

In focus mode are $$R = \frac{1}{P_2} \quad \backslash* \ MERGEFORMAT \qquad (9)$$

$$\theta = 2\arctan\frac{P_2}{2g_2} \quad \backslash* \ MERGEFORMAT \qquad (10)$$

$$\Delta Z = 2\frac{g_2}{\phi}P_2 \quad \backslash* \ MERGEFORMAT \qquad (11)$$

Here $L_2$ the distance between the lenslet array and the 3D image, $P_2$ is the aperture of the elemental lens and $$\frac{1}{R_d} = \phi$$

is the pixel size of the LED.

FIGS. 7(*a*) and (*b*) are schematic diagrams of the optical mapping models of the acquisition and display parts. In the process of virtual acquisition, the camera array 6 and focal plane 7 are both virtual. In the process of real acquisition, the camera array 6 and focal plane 7 are both real.

According to geometrical optics, assume that the object distance, the camera focus, the interval between adjacent cameras, and the disparity between adjacent elemental images of the collecting end are L1, g1, P1, and D respectively. The image distance, the distance between the lenslet array 2 and the LED display 1, the pitch of the lenslet array 2, and the disparity between adjacent elemental images of the display end are L2, g2, P2, and d, and β is the amplify coefficient. The optical mapping relation between collecting and display will be:

$$\frac{L_1}{g_1} = \frac{P_1}{D} \quad \backslash * \; MERGEFORMAT \tag{12}$$

$$\frac{L_2}{g_2} = \frac{P_2}{d} \quad \backslash * \; MERGEFORMAT \tag{13}$$

$$\frac{D}{d} = \beta \quad \backslash * \; MERGEFORMAT \tag{14}$$

FIG. 8 is a schematic diagram of the computer virtual acquisition system of the LED-based integral imaging system. The computational integral imaging simulates the optical acquisition to record the 3D information of the virtual scene by computer graphics. In acquisition, the viewing angle α, amount M and lens pitch $P_1$ of the virtual camera satisfy:

$$\tan\frac{\alpha}{2} = \frac{MP_1}{2L_1} \quad \backslash * \; MERGEFORMAT \tag{15}$$

The resolution of each camera is N×N which is consistent with the number of pixels included in the elemental lens 3 in display.

FIG. 9 is the real shoot process, including: camera array, computer, server, router and synchronizing signals controller.

FIG. 10 is the structure of the camera array which is divided into equal and non-equal interval $P_1=C$ and $P_1\neq C$ (C is constant) according to the camera pith; parallel and converge shooting according to shooting mode. Images from different views are taken by each camera, from which the spatial coordinates of the 3D point are determined using disparity, and elemental image array are generated by inverse mapping subsequently, which includes the following steps:

First calculate the parallax between each captured image and it's horizontally adjacent view image and the point where the mean square error is the smallest is determined as the matching point as follows:

$$MSE(m) = \frac{1}{T} \sum_{(k,l)\in l} [I_L(k, l) - I_R(k, l+m)]^2 \quad \backslash * \; MERGEFORMAT \tag{16}$$

$$D = \min MSE(m) \quad \backslash * \; MERGEFORMAT \tag{17}$$

Where $I_L$, $I_R$ are the left and right view image; k,l are the coordinate of the pixel in the view image; m is the pixel shift distance; T is the width of the view image; D is the parallax; the same can be obtained for the vertical parallax.

Then reconstruct the spatial coordinates of the object as FIG. 11 shows:

$$L_1 = g_1 \times B/D \backslash * MERGEFORMAT \tag{18}$$

$$X = X_L \times B/D \backslash * MERGEFORMAT \tag{19}$$

$$Y = Y_L \times B/D \backslash * MERGEFORMAT \tag{20}$$

$$D = X_L + X_R \backslash * MERGEFORMAT \tag{21}$$

Where $L_1$ is the distance between the object S and the camera, $g_1$ is the focal length, $X_L$, $X_R$ are the horizontal distance between the left and right view images where the object S imaging at. X and Y are the horizontal and vertical distances of the object S relative to the center of the left camera respectively. Finally, generate the elemental image array by back matching method. If the object point is mapped within the imaging range of the elemental lens 3, the pixel value of the object point is recorded in the corresponding elemental image; when the object point is mapped outside the imaging range of the elemental lens 3, the object point is discarded. As shown in FIG. 12, the imaging position of the object point S in a elemental lens is $$x = f \times (X - X_{lens})/(Z - Z_{lens}) \backslash * MERGEFORMAT \tag{22}$$

$$y = f \times (Y - Y_{lens})/(Z - Z_{lens}) \backslash * MERGEFORMAT \tag{23}$$

Where x, y are the coordinates of the imaging point; X, Y, Z are the spatial coordinate of the object point S; $X_{lens}$, $Y_{lens}$, $Z_{lens}$ denote the center coordinates of the elemental lens 3; the resolution of the elemental image is N×N which is consistent with the number of pixels included in the elemental lens 3 in display.

Figure 14:
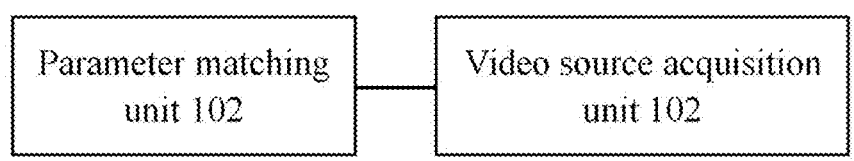
FIG. 14 is a structural schematic diagram, depicting an embodiment of the control device of the LED-based integral imaging display system according to the present invention.

Corresponding to the control method of LED-based integral imaging display system, a control device of this system is also disclosed, according to the embodiments of the present invention. The flow chart of one embodiment is shown in FIG. 14. The control device includes: parameter matching unit 102 and video source acquisition unit 104. The details comprise:

unit 102, parameter matching: matching the parameters of the lenslet array 2 and LED display 1 in the display part of said LED-based integral imaging display system to obtain the display parameters. For example, matching the parameters of the lenslet array 2 and the high-density small-pitch LED display 1; where, said display parameters consist of the basic parameters of said display part, and the corresponding optical imaging models, which match with said basic parameters, in different stereoscopic display modes. The detailed function and processing of the parameter matching unit 102 are given in step S110.

For example: referring to the example in FIG. 15, the high-density small-pitch LED-based integral imaging display system comprises: LED display (e.g. high-density small-pitch LED) 1, lenslet array 2, and elemental lens 3. The distance between LED 1 and lenslet array 2 is $g_2$.

In an optional example, said parameter matching unit 102 includes: parameter determination module and model establishing module. For example, parameter matching between the lenslet array 2 and the high-density small-pitch LED 1 (which is the display parameter designing method of integral imaging display system with high-density small-pitch LED). Specifically:

Parameter determination module: determining the basic parameters of the display part; wherein, said basic parameters include: at least one of the shape, aperture, arrangement, focal length, refractive index, radius of curvature, height of the hemisphere, and number of pixels of each elemental lens 3 in said lenslet array 2, and the pixel size of the LED display 1.

For example, designing the basic parameters of elemental lens 3 in lenslet array 2, wherein the basic parameters include: shape, aperture, arrangement, focal length, refractive index, and radius of curvature.

Optionally, said parameter determination module for determining the basic parameters of the display part includes: determining the shape, arrangement, focal length, and refractive index of said elemental lens 3; based on the shape, arrangement, focal length, and refractive index of said elemental lens 3, determining radius of curvature of said elemental lens 3.

More optionally, the shape of said elemental lens 3 includes: at least one of square and circle.

More optionally, the arrangement of said elemental lenses 3 includes: array arrangement.

More optionally, said elemental lens 3 includes: at least one of plano-convex lens inscribed a circular hole and plano-convex lens circumscribing a circular hole.

Hereby, different display effects can be achieved by using different elemental lenses, which is more flexible and convenient.

Optionally, said parameter determination module for determining the basic parameters of the display part also includes: determining the aperture of said elemental lens 3 and/or the pixel size of said LED display 1; when the radius of curvature of said elemental lens 3 is determined, determining the height of the base 4 of the elemental lens template that said elemental lens belongs to (i.e. height of the hemisphere of said elemental lens 3) according to the radius of curvature and aperture of said elemental lens 3.

For example, FIG. 16 and FIG. 17 are the structural schematic diagrams of the template of the elemental lens. Referring to the examples in FIG. 16 and FIG. 17, the template of the elemental lens may comprise: elemental lens 3 and base 4.

Let the shape of elemental lens 3 in lenslet array 2 be at least one of square and circle, the arrangement be array arrangement, the aperture of single lens (e.g. elemental lens 3) be $p_2$, the focal length be f, and the refractive index be n, then the radius of curvature r and height of the hemisphere h are:

$$r = f(n-1) \quad (1)$$

$$h = \sqrt{r^2 - \left(\frac{p_2}{2}\right)^2} - \sqrt{r^2 - \left(\frac{\sqrt{2}}{2}p_2\right)^2} \quad (2\text{-}1)$$

Hereby, the radius of curvature and the height of the hemispherical are determined based on the set shape, arrangement, focal length, refractive index, and aperture. Therefore, the accurate and reliable template of the elemental lens can improve the accuracy and reliability of 3D display.

Optionally, said parameter determination module for determining the basic parameters of the display part also includes determining the number of pixels in said elemental lens 3 according to the aperture of said elemental lens 3 and the pixel size of said LED display 1.

For example, let the pixel size of high-density small-pitch LED 1 be $\phi$, then the number of pixels contained in elemental lens 3 is:

$$N = \frac{p_2}{\phi} \quad (3)$$

Hereby, the number of pixels in an elemental lens is determined according to the pixel size of the LED display, that makes matching between the LED and lenslet array more accurate to improve the display effect and the viewing experience of the viewers.

More optionally, the pixel size of said LED display 1 includes: the pixel pitch of said LED display 1 is less than 1.5 mm (especially 1.25 mm).

Therefore, the stereoscopic effect is more impressive and the image colors are more bright, by using said LED display with the pixel pitch less than 1.5 mm (especially 1.25 mm).

Model establishing module: establishing the optical imaging models in different stereoscopic display modes based on said basic parameters; wherein, the different display modes include: at least one of the real, virtual, and focused modes.

For example, optical imaging models in different stereoscopic display modes are established according to the designed basic parameters of said elemental lens 3. The optical imaging models in different stereoscopic display modes include: optical imaging models in real mode, virtual mode, and focused modes.

Hereby, establishing optical imaging models in different stereoscopic display modes according to the basic parameters of elemental lens makes imaging of the to-be-displayed 3D objects more flexible, more widely used, and more convenient.

Optionally, said model establishing module for establishing the optical imaging models in different stereoscopic display modes includes:

obtaining the distance between said LED display 1 and said lenslet array 2.

if the distance between said LED display 1 and said lenslet array 2 is larger than the focal length of said elemental lens 3, establishing the optical imaging model in real mode.

For example, the stereoscopic display structural schematic diagram in real mode is shown in FIG. 3. Referring to the example in FIG. 3, the mode is real when the distance $g_2$ between LED display 1 and lenslet array 2 is larger than the focal length f of lenslet array 2. Here:

$$\frac{1}{f} = \frac{1}{g_2} + \frac{1}{L_2} \quad (4)$$

If the distance between said LED display 1 and said lenslet array 2 is smaller than the focal length of said elemental lens 3, establishing the optical imaging model in virtual mode.

For example, the stereoscopic display structural schematic diagram in virtual mode is shown in FIG. 4. Referring to the example in FIG. 4, the mode is virtual when the distance $g_2$ between LED display 1 and lenslet array 2 is smaller than the focal length f of lenslet array 2. Here:

$$\frac{1}{f} = \frac{1}{g_2} - \frac{1}{L_2} \quad (5)$$

If the distance between said LED display 1 and said lenslet array 2 is equal to the focal length of said elemental lens 3, establishing the optical imaging model in focused mode;

For example, the stereoscopic display structural schematic diagram in focused mode is shown in FIG. 5. Referring to the example in FIG. 5, the mode is focused when the distance $g_2$ between LED display 1 and lenslet array 2 is equal to the focal length f of lenslet array 2. So the image distance of 3D image is $L_2 \approx \infty$.

Determining at least one of the resolutions, viewing angle, and depth of the 3D image 10 in the optical imaging models in different stereoscopic display modes, according to the distance between said LED display 1 and said lenslet array 2, said basic parameters, and the image distance in the optical imaging models in different stereoscopic display modes.

Hereby, the stereoscopic display mode as well as one or more of the resolution, viewing angle and depth of the 3D image in the corresponding display mode are both determined, according to the relationship between the distance between the LED display and lenslet array and the focal length of the lenslet array, that enhances the accuracy and reliability of imaging of the to-be-displayed 3D objects.

More optionally, said model establishing module for determining at least one of the resolution, viewing angle, and depth of the 3D image 10 in the optical imaging models in different stereoscopic display modes includes: determining the resolution of the 3D image 10 in the optical imaging model in said real mode or said virtual mode, according to the distance between said LED display 1 and said lenslet array 2, the pixel size of said LED display 1, and the image distance of the 3D image 10 in the optical imaging model in said real mode or said virtual mode; or determining the resolution of the 3D image 10 in the optical imaging model in said focused mode, according to the aperture of said elemental lens 3.

More optionally, said model establishing module for determining at least one of the resolution, viewing angle, and depth of the 3D image 10 in the optical imaging models in different stereoscopic display modes also includes: determining the viewing angle of the 3D image 10 in the optical imaging models in different stereoscopic display modes, according to the aperture of said elemental lens 3 and the distance between said LED display 1 and said lenslet array 2.

More optionally, said model establishing module for determining at least one of the resolution, viewing angle, and depth of the 3D image 10 in the optical imaging models in different stereoscopic display modes also includes: when the resolution of the 3D image 10 in the optical imaging model in real or virtual mode is determined, determining the depth of the 3D image 10 in the optical imaging model in real or virtual mode, according to the image distance and resolution of the 3D image 10 in the optical imaging model in real or virtual mode, as well as the aperture of said elemental lens 3; or determining the depth of the 3D image 10 in the optical imaging model in said focused mode, according to the separation distance, aperture, and pixel size.

For example, the optical design schematic diagram of the integral imaging display platform is shown in FIG. 6. The light emitted from LED display 1 is focused on central depth plane 5 after being refracted by the lenslet array. The center of 3D image (e.g. 3D image 10) is on the central depth plane 5. In real mode (or, when the stereoscopic display mode is real or virtual), the resolution R, viewing angle θ, and depth ΔZ of the 3D image are:

$$R = \frac{g_2}{L_2 \phi} \quad (6)$$

$$\theta = 2\arctan\frac{P_2}{2g_2} \quad (7)$$

$$\Delta Z = 2\frac{L_2}{RP_2} \quad (8)$$

For example, referring to the example in FIG. 6, in virtual mode, the resolution, viewing angle, and depth of the 3D image are same as those in real mode.

For example, referring to the example in FIG. 6, in focused mode, the resolution R, viewing angle θ, and depth ΔZ of the 3D image are:

$$R = \frac{1}{P_2} \quad (9)$$

$$\theta = 2\arctan\frac{P_2}{2g_2} \quad (10)$$

$$\Delta Z = 2\frac{g_2}{\phi}P_2 \quad (11)$$

where $L_2$ is the image distance, $p_2$ is the aperture of elemental lens, and $\phi$ is the pixel size of LED in Equations 6, 7, 8, 9, 10, and 11.

Hereby, the display parameters can be accurately determined by determining one or more of the resolution, viewing angle, and depth in different stereoscopic display modes, which makes the acquisition of integral imaging video sources more convenient and more reliable.

Optionally, said model establishing module for establishing the optical imaging models in different stereoscopic display modes also includes: setting the focal length of the camera, the distance between lenses of the camera array, the disparities between adjacent elemental images, as well as the distance between the to-be-displayed 3D object and the cameras in the acquisition part of said LED-based integral imaging display system; according to geometrical optics, determining the distance between the lenslet array 2 and the LED display 1, the pitch between adjacent elemental lenses 3 in the lenslet array 2, the disparities between adjacent elemental images, and the distance between the elemental lens 3 and the to-be-displayed 3D image 10 in the display part of said LED-based integral imaging display system; obtaining the optical mapping model between the acquisition and display parts of said integral imaging display system.

For example, set the steps to establish the optical mapping model between the acquisition and display parts.

The structural schematic diagrams of the optical mapping model between the acquisition and display parts are shown in FIG. 7(*a*) and FIG. 7(*b*). In the process of computer virtual acquisition, camera array 6 and focal plane 7 are both virtual; in the process of real acquisition, camera array 6 and focal plane 7 are both real.

Video source acquisition unit 104: according to said display parameters, acquiring the integral imaging video sources required by LED-based integral imaging naked-eye stereoscopic display, which is used for the to-be-displayed 3D image; for example, acquiring the integral imaging video sources required by stereoscopic display according to the display parameters obtained after matching (e.g. elemental image array).

For example, the high-density small-pitch LED-based integral imaging display system matches the parameters of the lenslet array 2 and LED display (e.g. high-density small-pitch LED display 1), and generates integral imaging video sources according to the display parameters after matching, which solves the problem that the LED-based integral imaging display has not been done so far.

For example, the high-density small-pitch LED-based integral imaging display system matches the parameters of the lenslet array and LED display to realize the LED-based integral imaging display using the integral imaging video sources generated by the display platform.

In the present invention, the problem of parameter (focal length and viewing angle) matching between the lenslet array and display platform is solved by jointly considering the resolution of the elemental image, and the depth and viewing angle of the 3D image. The optical matching models are also established to truly realize the integral imaging naked-eye 3D display on the LED screen.

Hereby, the integral imaging video source of the to-be-displayed 3D object is acquired by matching the parameters of the lenslet array and LED display according to the display parameters after matching, that realizes naked-eye 3D display with impressive display effect and bright colors.

In an optional example, said video source acquisition unit 104 includes: determining camera array module and capturing video sources module. Specifically:

determining camera array module: determining the camera array 6 according to said display parameters; wherein, said camera array 6 includes: virtual camera array or real camera array;

capturing video sources module: using each camera 9 in said camera array 6 to acquire the integral imaging video source for LED-based naked-eye stereoscopic display of the 3D object.

In an optional example, said video source acquisition unit 104 includes: virtual acquisition module or real acquisition module.

For example, acquiring the integral imaging video sources required by stereoscopic display according to the display parameters obtained after matching (e.g. elemental image array) includes: virtual acquisition and real acquisition. Specifically:

said virtual acquisition module includes: according to said display parameters, simulating the optical acquisition system in the computer to establish a virtual camera array; generating the video sources of the integral imaging system by using each camera of the virtual camera array and based on the records using computer graphics technique and the 3D information of the virtual 3D objects corresponding to the to-be-displayed 3D object.

For example, the structural schematic diagram of the computer virtual acquisition is shown in FIG. 8. Referring to the example in FIG. 8, the process of virtual acquisition includes: using computer to simulate the optical acquisition system and recording 3D information of the virtual scene using computer graphics technique.

Optionally, in said virtual acquisition module, the viewing angle of said virtual camera is determined according to the number of the virtual cameras, the interval between two adjacent virtual cameras in said virtual camera array, and the distance between the virtual 3D object and said virtual camera.

For example, in the process of virtual acquisition, the viewing angle $\alpha$, number M, and pitch $p_1$ of virtual camera satisfy:

$$\tan\frac{\alpha}{2} = \frac{MP_1}{2L_1} \qquad (15)$$

Optionally, the resolution of said virtual camera is consistent with the number of the pixels in elemental lens 3 of said lenslet array 2.

For example, the resolution of virtual camera is consistent with the number of pixels in elemental lens 3 in the display part, that is N×N.

Hereby, the accuracy and reliability of virtual acquisition are improved according to one or more of the viewing angle, number, pitch, image distance, and resolution of virtual camera.

Said real acquisition module includes: establishing the real camera array in the real acquisition system, according to said display parameters; generating the images at different viewing angles of said to-be-displayed 3D object using each camera of the real camera array, and calculating their disparity maps of the images at said different viewing angles; reconstructing 3D points corresponding to said to-be-displayed 3D object, using the disparity maps of the images at different viewing angles; generating the elemental image array as said video sources of the integral imaging system, by back-projecting the 3D points.

For example, the process of real acquisition includes: acquiring images at different viewing angles by each camera in the real acquisition system; determining the coordinates of 3D points using the disparities; generating elemental images (e.g. elemental image 11) via back-projecting.

For example, the structural schematic diagram of the real acquisition system is shown in FIG. 9. Referring to the example in FIG. 9, the real acquisition system can include: camera array 6, computer 13, server 14, router 15, and synchronous signal controller 16. For example, the said real acquisition system can also include: computer 13, server 14, router 15, and controller 16. Here, said server 14 and said controller 16 are connected with said real camera array; said router 15 is connected with said server 14; said controller 16 is connected with said computer 13.

Here, the computer 13 can be used to control the synchronous signal controller; the server 14 can be used for signal processing, and the synchronous signal controller 16 can be used to control synchronous acquisition of the camera array.

Hereby, by using virtual, real, and other acquisition modes, one can collect the 3D information of the to-be-displayed 3D objects more flexibly and more conveniently, and obtain more accurate and more reliable captured data.

Optionally, in said real acquisition module, said arrangement of the real camera array includes: arrangement with equal or non-equal intervals according to the intervals among the real cameras; and/or parallel or converged arrangement set according to the way of capturing.

For example, the structural schematic diagram of the camera array arrangement is shown in FIG. 10. Referring to the example in FIG. 10, in the process of real acquisition, the arrangement of the camera array 6 can be divided by equal-interval ($P_1$=C) arrangement and non-equal-interval ($P_1 \neq C$) arrangement according to the interval between adjacent cameras. It can also be divided by parallel arrangement and converged arrangement according to the way of capturing.

Hereby, the 3D information of the to-be-displayed 3D object can be collected by various means of camera array arrangement, which are more flexible, more convenient and more widely used.

Optionally, in said real acquisition module, calculating the disparity maps of the images at different viewing angles includes: for each pixel in one captured image, calculating the mean square error functions within a certain horizontal range relative to its horizontally neighboring images; selecting the shift with the minimum mean square error as the horizontal disparity of this pixel; then the horizontal disparity map of said image is obtained;

similarly, calculating the disparity maps of the images at different viewing angles includes: for each pixel in one captured image, calculating the mean square error functions within a certain vertical range relative to its vertically neighboring images; selecting the shift with the minimum mean square error as the vertical disparity of this pixel; then the vertical disparity map of said image is obtained.

For example, firstly the disparity maps between each captured image and its horizontally adjacent viewpoint images are calculated by:

$$MSE(m) = \frac{1}{T} \sum_{(k,l) \in I} [I_L(k, l) - I_R(k, l + m)]^2 \qquad (16)$$

And the pixel with the minimum MSE is determined as the matching pixel based on the above calculation, that is:

$$D = \min MSE(m) \qquad (17)$$

In Equations 16 and 17, $I_L$ is the left viewpoint image and $I_R$ is the right viewpoint image. K and l are the coordinates of the pixel. m is the shift of the pixel. T is the image width. D is the disparity.

Similarly, the disparity maps between vertical viewpoints can be calculated.

Hereby, the accuracy and reliability of disparity calculation are improved by considering the viewpoint images in different directions, thus improving the accuracy and reliability of the reconstruction of the to-be-displayed 3D objects.

Optionally, in said real acquisition module, reconstructing 3D points of the to-be-displayed 3D objects includes: determining the coordinates of said 3D point, according to the focal length of said real camera, the distance between the point and the leftmost real camera, the disparity maps of the images at different viewing angles, the distances between the imaging points of this point in different real cameras and the corresponding image centers of the real cameras.

For example, to reconstruct the captured 3D object, an example is shown in FIG. 11. As shown in FIG. 11, the camera array 6 includes: two cameras (e.g. camera 9), such as the left camera and the right camera. Each camera includes: lens 8 and focal plane 7.

Let $L_1$ be the distance from the object point S to the camera, $g_1$ be the focal length of the camera, and D be the parallax, then:

$$L_1 = g_1 \times B/D \qquad (18)$$

$$D = X_L + X_R \qquad (21)$$

where $X_L$ and $X_R$ are the lateral distances of the projections of the object point S in the left and right views from the image centers, respectively. B is the distance between the centers of the left and right cameras.

In addition, let X and Y be the horizontal and vertical distances of the object point S relative to the center of the left camera, respectively. Then:

$$X = X_L \times B/D \qquad (19)$$

$$Y = Y_L \times B/D \qquad (20)$$

Hereby, by reconstructing 3D points of the to-be-displayed 3D objects, the accuracy and reliability of the stereoscopic display can be improved.

Optionally, in said real acquisition module, generating the elemental image array includes:

determining the positions of the imaging points of the to-be-displayed 3D objects in said elemental lens 3, according to the coordinates of 3D point of the to-be-displayed 3D objects, the center positions of the elemental lens 3 in said lenslet array 2, and the focal length of said elemental lens 3; and then obtaining the imaging range of said elemental lens 3;

recording the colors of the 3D objects projected within the imaging range of said elemental lens 3 into the elemental image 11 corresponding to the elemental lens 3;

arranging all elemental images 11 of said lenslet array 2 into an array to obtain said elemental image array.

For example: generating elemental image array via back-projecting:

When the projection of the object point is within the imaging range of the elemental lens 3, the color of this object point is recorded in the corresponding elemental image; When the projection of the object point is outside the imaging range of the elemental lens 3, this object point is discarded. As shown in FIG. 12, the imaging position of the object point S in one elemental lens is:

$$x = f \times (X - X_{lens})/(Z - Z_{lens}) \qquad (22)$$

$$y = f \times (Y - Y_{lens})/(Z - Z_{lens}) \qquad (23)$$

In Equations 22 and 23, x and y are the coordinates of the imaging point. X, Y, and Z are the coordinates of the object point S. $X_{lens}$, $Y_{lens}$, and $Z_{lens}$ are the coordinates of the center position of the elemental lens 3. The resolution of the elemental image is same as the number of pixels in the elemental lens 3 in the display part, i.e. N×N. N is a natural number.

X can be calculated according to Equation 19. Y can be calculated according to Equation 20. Z can be set as $L_1$ in FIG. 11.

Hereby, generating the elemental image array of the to-be-displayed 3D object by back-projecting the reconstructed points of this object is accurate and reliable, which can improve the stereoscopic display effect and color brightness.

An optional embodiment includes: a display step: said integral imaging video source is displayed on said LED display 1, that realizes the LED-based integral imaging naked-eye 3D display for said to-be-displayed 3D object.

Hereby, the integral imaging naked-eye 3D display is realized by displaying the integral imaging video source of the 3D object with convenience and good stereoscopic effect.

Since the processing and functions implemented by this control device in this embodiment basically correspond to the embodiments, principles and examples of the control method shown in the foregoing FIG. 13, thus one can refer to the corresponding descriptions in the foregoing embodiments for anything that is not elaborated in the present embodiment. No more detailed descriptions will be repeated here.

Through the verification by a large number of tests, the technical solution of the invention is used to achieve the first LED-based integral imaging naked eye stereoscopic display, by matching the parameters of the lenslet array and LED display, and acquiring the integral imaging video sources according to the display parameters after matching.

According to the embodiments of the present invention, a LED-based integral imaging display system corresponding to the control device of LED-based integral imaging display system is also disclosed. This LED-based integral imaging display system includes: the above control device of LED-based integral imaging display system.

In an optional example, the solution of the invention provides a high-density small-pitch LED-based integral imaging display system, which belongs to the stereoscopic video display technical field. FIG. 15 shows the schematic diagram of the high-density small-pitch LED-based integral imaging display system. Referring to the example in FIG. 15, this high-density small-pitch LED integral imaging display system include: LED display (e.g. a high-density small-pitch LED) 1, lenslet array 2, and elemental lens 3. The distance between the high-density small-pitch LED 1 and lenslet array 2 is $g_2$. This high-density small-pitch LED-based display system can achieve naked-eye stereoscopic display with outstanding effect and bright colors, by matching the parameters of the lenslet array 2 and LED display 1, and acquiring the integral imaging video sources (e.g. elemental image array) according to the display parameters after matching.

For example, the present system can achieve the first LED-based integral imaging naked eye stereoscopic display, by matching the parameters of the lenslet array 2 and LED display 1, and acquiring the integral imaging video sources according to the display parameters after matching.

For example, the present system can achieve the LED-based integral imaging naked eye stereoscopic display, by matching the parameters of the lenslet array 2 and LED display 1, and acquiring the integral imaging video sources according to the display platform.

For example, the display platform includes: lenslet array 2, LED display 3, and computer 13, etc. The computer 13 controls the LED display 3 to generate an elemental image array, which is refracted by the lenslet array 2 in front of the LED display 3, and then reconstructs the 3D image in 3D space.

The step of generating the integral imaging video sources (e.g. elemental image array) required by stereoscopic imaging according to the matched display parameters, includes: real acquisition and virtual acquisition.

In an optional example, implementing this high-density small-pitch LED-based integral imaging display system includes:

Step 1: matching the parameters of the lenslet array 2 and high-density small-pitch LED display 1 (i.e. the display parameter designing method of the high-density small-pitch LED integral imaging display system).

Wherein, in Step 1, the parameter matching between the lenslet array 2 and high-density small-pitch LED display lspecifically includes:

Step 11: designing the basic parameters of the elemental lens 3 in lenslet array 2. The basic parameters includes: shape, aperture, arrangement, focal length, refractive index, and radius of curvature.

Optionally, a specific description of the parameter designing of elemental lens 3 in Step 11 is as follows.

FIG. 16 and FIG. 17 are the structural schematic diagrams of the template of the elemental lens. Referring to the examples in FIG. 16 and FIG. 17, the template of the elemental lens may comprise: elemental lens 3 and base 4.

For example, the template of elemental lens can be determined by the parameters of elemental lens 3. The template of elemental lens can be a template for producing a lens (e.g. elemental lens 3), which is the smallest unit of the lenslet array. In addition, since the lens is very thin (e.g., the thickness is only a few millimeters), it is inconvenient to use directly. Therefore, for convenience, a base 4 is required under the lens to increase the lens thickness.

Let the shape of elemental lens 3 in lenslet array 2 be at least one of square and circle, the arrangement be array arrangement, the aperture of single lens (e.g. elemental lens 3) be $p_2$, the focal length be f, and the refractive index be n, then the radius of curvature r and height of the hemisphere h are:

$$r = f(n-1) \quad (1)$$

$$h = \sqrt{r^2 - \left(\frac{p_2}{2}\right)^2} - \sqrt{r^2 - \left(\frac{\sqrt{2}}{2}p_2\right)^2} \quad (2\text{-}1)$$

Let the pixel size of high-density small-pitch LED 1 be $\phi$, then the number of pixels contained in elemental lens 3 is:

$$N = \frac{P_2}{\phi} \quad (3)$$

Step 12: establishing the optical imaging models in different stereoscopic display modes based on the basic parameters of elemental lens 3; wherein, the optical imaging models in different stereoscopic display modes include: the optical imaging models in real, virtual, and focused modes.

Optionally, a specific description of establishing the optical imaging model in different stereoscopic display modes in Step 12 is as follows.

The stereoscopic display structural schematic diagram in real mode is shown in FIG. 3. Referring to the example in FIG. 3, the mode is real when the distance $g_2$ between LED display 1 and lenslet array 2 is larger than the focal length f of lenslet array 2. Here:

$$\frac{1}{f} = \frac{1}{g_2} + \frac{1}{L_2} \quad (4)$$

The optical design schematic diagram of the integral imaging display platform is shown in FIG. 6. The light emitted from LED display 1 is focused on central depth plane 5 after being refracted by the lenslet array. The center of 3D image (e.g. 3D image 10) is on the central depth plane 5. In real mode (or, when the stereoscopic display mode is real or virtual), the resolution R, viewing angle $\theta$, and depth $\Delta Z$ of the 3D image are:

$$R = \frac{g_2}{L_2 \phi} \quad (6)$$

$$\theta = 2\arctan\frac{P_2}{2g_2} \quad (7)$$

$$\Delta Z = 2\frac{L_2}{RP_2} \quad (8)$$

The stereoscopic display structural schematic diagram in virtual mode is shown in FIG. 4. Referring to the example in FIG. 4, the mode is virtual when the distance $g_2$ between LED display 1 and lenslet array 2 is smaller than the focal length f of lenslet array 2. Here:

$$\frac{1}{f} = \frac{1}{g_2} - \frac{1}{L_2} \quad (5)$$

Referring to the example in FIG. 6, in virtual mode, the resolution, viewing angle, and depth of the 3D image are same as those in real mode.

The stereoscopic display structural schematic diagram in focused mode is shown in FIG. 5. Referring to the example in FIG. 5, the mode is focused when the distance $g_2$ between LED display 1 and lenslet array 2 is equal to the focal length f of lenslet array 2. So the image distance of 3D image is $L_2 \approx \infty$.

Referring to the example in FIG. 6, in focused mode, the resolution R, viewing angle θ, and depth ΔZ of the 3D image are:

$$R = \frac{1}{P_2} \quad (9)$$

$$\theta = 2\arctan\frac{P_2}{2g_2} \quad (10)$$

$$\Delta Z = 2\frac{g_2}{\phi}P_2 \quad (11)$$

$L_2$ is the image distance, $p_2$ is the aperture of elemental lens, and φ is the pixel size of LED in Equations 6, 7, 8, 9, 10, and 11.

Step 2: acquiring the integral imaging video sources, including: virtual acquisition and real acquisition.

Step 21: virtual acquisition.

The structural schematic diagram of the computer virtual acquisition is shown in FIG. 8. Referring to the example in FIG. 8, the process of virtual acquisition includes: using computer to simulate the optical acquisition system and recording 3D information of the virtual scene using computer graphics technique.

Optionally, in the process of virtual acquisition, the viewing angle α, number M, and pitch $p_1$ of virtual camera satisfy:

$$\tan\frac{\alpha}{2} = \frac{MP_1}{2L_1} \quad (12)$$

Optionally, the resolution of virtual camera is consistent with the number of pixels in elemental lens 3 in the display part, that is N×N.

Step 22: real acquisition.

The structural schematic diagram of the real acquisition system is shown in FIG. 9. Referring to the example in FIG. 9, the real acquisition system can include: camera array 6, computer 13, server 14, router 15, and synchronous signal controller 16.

Here, the computer 13 can be used to control the synchronous signal controller; the server 14 can be used for signal processing, and the synchronous signal controller 16 can be used to control synchronous acquisition of the camera array.

The structural schematic diagram of the camera array arrangement is shown in FIG. 10. Referring to the example in FIG. 10, in the process of real acquisition, the arrangement of the camera array 6 includes: arrangement with equal ($P_1=C$) or non-equal ($P_1 \neq C$) intervals according to the intervals among the real cameras (C is a constant); and/or parallel or converged arrangement set according to the way of capturing.

The process of real acquisition includes: acquiring images at different viewing angles by each camera in the real acquisition system; determining the coordinates of 3D points using the disparities; generating elemental images 11 via back-projecting.

The process of real acquisition specifically includes:

Step 221: firstly calculating the disparity maps between each captured image and its horizontally adjacent viewpoint images by:

$$MSE(m) = \frac{1}{T}\sum_{(k,l)\in I}[I_L(k,l) - I_R(k,l+m)]^2 \quad (16)$$

And the pixel with the minimum MSE is determined as the matching pixel based on the above calculation, that is:

$$D = \min MSE(m) \quad (17)$$

In Equations 16 and 17, $I_L$ is the left viewpoint image and $I_R$ is the right viewpoint image. K and l are the coordinates of the pixel. m is the shift of the pixel. T is the image width. D is the disparity.

Similarly, the disparity maps between vertical viewpoints can be calculated.

Step 222: then reconstructing the captured 3D object. An example is shown in FIG. 11. As shown in FIG. 11, the camera array 6 includes: two cameras (e.g. camera 9), such as the left camera and the right camera. Each camera includes: lens 8 and focal plane 7.

Let $L_1$ be the distance from the object point S to the camera, $g_1$ be the focal length of the camera, and D be the parallax, then:

$$L_1 = g_1 \times B/D \quad (18)$$

$$D = X_L + X_R \quad (21)$$

where $X_L$ and $X_R$ are the lateral distances of the projections of the object point S in the left and right views from the image centers, respectively. B is the distance between the centers of the left and right cameras.

In addition, let X and Y be the horizontal and vertical distances of the object point S relative to the center of the left camera, respectively. Then:

$$X = X_L \times B/D \quad (19)$$

$$Y = Y_L \times B/D \quad (20)$$

Step 223: generating elemental image array via back-projecting:

When the projection of the object point is within the imaging range of the elemental lens 3, the color of this object point is recorded in the corresponding elemental image; when the projection of the object point is outside the imaging range of the elemental lens 3, this object point is discarded. As shown in FIG. 12, the imaging position of the object point S in one elemental lens is:

$$x = f \times (X - X_{lens})/(Z - Z_{lens}) \quad (22)$$

$$y = f \times (Y - Y_{lens})/(Z - Z_{lens}) \quad (23)$$

In Equations 22 and 23, x and y are the coordinates of the imaging point. X, Y, and Z are the coordinates of the object point S. $X_{lens}$, $Y_{lens}$, and $Z_{lens}$ are the coordinates of the center position of the elemental lens 3. The resolution of the elemental image is same as the number of pixels in the elemental lens 3 in the display part, i.e. N×N. N is a natural number.

X can be calculated according to Equation 19. Y can be calculated according to Equation 20. Z can be set as $L_1$ in FIG. 11.

In an optional example, the implementation of this high-density small-pitch LED-based integral imaging display system also includes: a step between Steps 1 and 2 that establishes the optical mapping model between the acquisition and display parts.

FIG. 7(*a*) and FIG. 7(*b*) are schematic diagrams of the optical mapping models of the acquisition and display parts. In the process of virtual acquisition, the camera array 6 and focal plane 7 are both virtual. In the process of real acquisition, the camera array 6 and focal plane 7 are both real.

Since the processing and functions implemented by the LED-based integral imaging 3D display system in this embodiment basically correspond to the embodiments, principles and examples of the control device shown in the foregoing FIG. 14, thus one can refer to the corresponding descriptions in the foregoing embodiments for anything that is not elaborated in the present embodiment. No more detailed descriptions will be repeated here.

Through the verification by a large number of tests, the technical solution of the invention can achieve LED-based integral imaging naked eye stereoscopic display with outstanding effect, by matching the parameters of the lenslet array and LED display, and acquiring the integral imaging video sources according to the display platform.

According to the embodiments of the present invention, a LED-based integral imaging display system corresponding to the control method of LED-based integral imaging display system is also disclosed. This LED-based integral imaging display system includes: the above control device of LED-based integral imaging display system.

Since the processing and functions implemented by the LED-based integral imaging 3D display system in this embodiment basically correspond to the embodiments, principles and examples of the control device shown in the foregoing FIG. 13, thus one can refer to the corresponding descriptions in the foregoing embodiments for anything that is not elaborated in the present embodiment. No more detailed descriptions will be repeated here.

Through the verification by a large number of tests, the technical solution of the invention is used to display through a plurality of stereoscopic display modes, which is beneficial for improving the stereoscopic display effect and the display range.

To sum up, one skilled in the art will readily understand that, without conflict, the various advantageous modes described above can be freely combined and superimposed.

The foregoing descriptions are merely exemplary embodiments of the invention. They do not limit the invention. For one skilled in the art, the invention may have various modifications and changes. Any modifications, equivalent substitutions, improvements and the like made without departing from the spirit and principle of the invention should be included in the scope of the claims of the present invention.

The invention claimed is:

1. A control method of LED-based integral imaging display system, comprising:

a parameter matching step: matching the parameters of the lenslet array and LED display in the display part of said LED-based integral imaging display system to obtain the display parameters; wherein, said display parameters consist of the basic parameters of said display part, and the corresponding optical imaging models, which match with said basic parameters, in different stereoscopic display modes; wherein said parameter matching step includes:

a parameter determination step: determining the basic parameters of the display part, including;

determining the shape, arrangement, focal length, and refractive index of said elemental lens; based on the shape, arrangement, focal length, and refractive index of said elemental lens, determining radius of curvature of said elemental lens;

determining the aperture of said elemental lens and/or the pixel size of said LED display; when the radius of curvature of said elemental lens is determined, determining the height of the base of the elemental lens template that said elemental lens belongs to according to the radius of curvature and aperture of said elemental lens;

determining the number of pixels in said elemental lens according to the aperture of said elemental lens and the pixel size of said LED display;

a video source acquisition step: according to said display parameters, acquiring the integral imaging video sources required by LED-based integral imaging naked-eye stereoscopic display, which is used for the to-be-displayed 3D image.

2. The method according to claim 1, wherein;

the shape of said elemental lens includes: at least one of square and circle;

the arrangement of said elemental lenses includes: array arrangement;

the pixel size of said LED display includes: the pixel pitch of said LED display is less than 1.5 mm;

said elemental lens includes: at least one of plano-convex lens inscribed a circular hole and plano-convex lens circumscribing a circular hole.

3. A control device of LED-based integral imaging display system matched with the method according to claim 1, comprising;

a parameter matching unit for performing the parameter matching step, and a video source acquisition unit for performing the video acquisition step.

4. The control device of LED-based integral imaging display system of claim 3, wherein;

the shape of said elemental lens includes: at least one of square and circle;

the arrangement of said elemental lenses includes: array arrangement;

the pixel size of said LED display includes: the pixel pitch of said LED display is less than 1.5 mm;

said elemental lens includes: at least one of plano-convex lens inscribed a circular hole and plano-convex lens circumscribing a circular hole.

5. A control method of LED-based integral imaging display system, comprising:

a parameter matching step: matching the parameters of the lenslet array and LED display in the display part of said LED-based integral imaging display system to obtain the display parameters; wherein, said display parameters consist of the basic parameters of said display part, and the corresponding optical imaging models, which match with said basic parameters, in different stereoscopic display modes; wherein said parameter matching step includes:

model establishing step: establishing the optical imaging models in different stereoscopic display modes based on said basic parameters;

wherein, said basic parameters include: at least one of the shape, aperture, arrangement, focal length, refractive index, radius of curvature, height of the hemisphere, and number of pixels of each elemental lens in said lenslet array, and the pixel size of the LED display;

the different display modes include: at least one of the real, virtual, and focused modes; wherein said model establishing step includes:

obtaining the distance between said LED display and said lenslet array;

if the distance between said LED display and said lenslet array is larger than the focal length of said elemental lens, establishing the optical imaging model in real mode; if the distance between said LED display and said lenslet array is smaller than the focal length of said elemental lens, establishing the optical imaging model in virtual mode; if the distance between said LED display and said lenslet array is equal to the focal length of said elemental lens, establishing the optical imaging model in focused mode;

determining the resolution, viewing angle, and depth of the 3D image in the optical imaging models in different stereoscopic display modes, according to the distance between said LED display and said lenslet array, said basic parameters, and the image distance in the optical imaging models in different stereoscopic display modes;

a video source acquisition step: according to said display parameters, acquiring the integral imaging video sources required by LED-based integral imaging naked-eye stereoscopic display, which is used for the to-be-displayed 3D image.

6. The method of claim 5, wherein the determination of the resolution, viewing angle, and depth of the 3D image in the optical imaging models in different stereoscopic display modes includes:

determining the resolution of the 3D image in the optical imaging model in said real mode or said virtual mode, according to the distance between said LED display and said lenslet array, the pixel size of said LED display, and the image distance of the 3D image in the optical imaging model in said real mode or said virtual mode;

determining the viewing angle of the 3D image in the optical imaging models in different stereoscopic display modes, according to the aperture of said elemental lens and the distance between said LED display and said lenslet array;

when the resolution of the 3D image in the optical imaging model in real or virtual mode is determined, determining the depth of the 3D image in the optical imaging model in real or virtual mode, according to the image distance and resolution of the 3D image in the optical imaging model in real or virtual mode, as well as the aperture of said elemental lens.

7. The method of claim 5, wherein the determination of the resolution, viewing angle, and depth of the 3D image in the optical imaging models in different stereoscopic display modes includes:

determining the resolution of the 3D image in the optical imaging model in said focused mode, according to the aperture of said elemental lens;

determining the depth of the 3D image in the optical imaging model in said focused mode, according to the separation distance, aperture, and pixel size.

8. A control device of LED-based integral imaging display system matched with the method according to claim 5, comprising;

a parameter matching unit for performing the parameter matching step, wherein said parameter matching unit includes:

a parameter determination module: determining the basic parameters of the display part;

a model establishing module: establishing the optical imaging models in different stereoscopic display modes based on said basic parameters;

wherein, said basic parameters include: at least one of the shape, aperture, arrangement, focal length, refractive index, radius of curvature, height of the hemisphere, and number of pixels of each elemental lens in said lenslet array, and the pixel size of the LED display;

the different display modes include: at least one of the real, virtual, and focused modes, and a video source acquisition unit for performing the video acquisition step.

9. The device according to claim 8, wherein the determination of the resolution, viewing angle, and depth of the 3D image in the optical imaging models in different stereoscopic display modes includes:

determining the resolution of the 3D image in the optical imaging model in said real mode or said virtual mode, according to the distance between said LED display and said lenslet array, the pixel size of said LED display, and the image distance of the 3D image in the optical imaging model in said real mode or said virtual mode;

determining the viewing angle of the 3D image in the optical imaging models in different stereoscopic display modes, according to the aperture of said elemental lens and the distance between said LED display and said lenslet array;

when the resolution of the 3D image in the optical imaging model in real or virtual mode is determined, determining the depth of the 3D image in the optical imaging model in real or virtual mode, according to the image distance and resolution of the 3D image in the optical imaging model in real or virtual mode, as well as the aperture of said elemental lens.

10. The device according to claim 8, wherein the determination of the resolution, viewing angle, and depth of the 3D image in the optical imaging models in different stereoscopic display modes includes:

determining the resolution of the 3D image in the optical imaging model in said focused mode, according to the aperture of said elemental lens;

determining the depth of the 3D image in the optical imaging model in said focused mode, according to the separation distance, aperture, and pixel size.

11. A control method of LED-based integral imaging display system, comprising:

a parameter matching step: matching the parameters of the lenslet array and LED display in the display part of said LED-based integral imaging display system to obtain the display parameters; wherein, said display parameters consist of the basic parameters of said display part, and the corresponding optical imaging models, which match with said basic parameters, in different stereoscopic display modes;

a video source acquisition step: according to said display parameters, acquiring the integral imaging video sources required by LED-based integral imaging naked-eye stereoscopic display, which is used for the to-be-displayed 3D image; wherein, said video source acquisition step includes:

a real acquisition step; wherein said real acquisition step includes:

establishing a real camera array, according to said display parameters;

generating the images at different viewing angles of said to-be-displayed 3D object using each camera of the real camera array, and calculating their disparity maps of the images at said different viewing angles;

reconstructing 3D points corresponding to said to-be-displayed 3D object, using the disparity maps of the images at different viewing angles;

generating the elemental image array as said video sources of the integral imaging system, by back-projecting the 3D points.

12. The method of claim 11, wherein, said video source acquisition step also includes:

a virtual acquisition step; wherein, said virtual acquisition step includes:

according to said display parameters, simulating the optical acquisition system in the computer to establish a virtual camera array;

generating the video sources of the integral imaging system by using each camera of the virtual camera array and based on the records using computer graphics technique and the 3D information of the virtual 3D object corresponding to the to-be-displayed 3D object, and, in said virtual acquisition step, the viewing angle of said virtual camera is determined according to the number of the virtual cameras, the interval between two adjacent virtual cameras in said virtual camera array, and the distance between the virtual 3D object and said virtual camera;

the resolution of the virtual camera is consistent with the number of the pixels in the elemental lens of said lenslet array;

and in the real acquisition step, the arrangement of the real camera array includes:

arrangement with equal or non-equal intervals according to the intervals among the real cameras;

parallel or converged arrangement set according to the way of capturing.

13. A control device of LED-based integral imaging display system matched with the control method of claim 12, comprising:

a parameter matching unit for performing the parameter matching step, and a video source acquisition unit for performing the video acquisition step.

14. The method of claim 11, wherein, calculating the disparity maps of the images at different viewing angles includes:

for each pixel in one captured image, calculating the mean square error functions within a certain horizontal range relative to its horizontally neighboring images; selecting the shift with the minimum mean square error as the horizontal disparity of this pixel; then the horizontal disparity map of said image is obtained;

for each pixel in one captured image, calculating the mean square error functions within a certain vertical range relative to its vertically neighboring images; selecting the shift with the minimum mean square error as the vertical disparity of this pixel; then the vertical disparity map of said image is obtained;

and reconstructing 3D points of the to-be-displayed 3D object includes:

determining the coordinates of said 3D point, according to the focal length of said real camera, the distance between the point and the leftmost real camera, the disparity maps of the images at different viewing angles, the distances between the imaging points of this point in different real cameras and the corresponding image centers of the real cameras;

and generating the elemental image array includes:

determining the positions of the imaging points of the to-be-displayed 3D object in said elemental lens, according to the coordinates of 3D point of the to-be-displayed 3D object, the center positions of the elemental lens in said lenslet array, and the focal length of said elemental lens;

recording the RGB values of the 3D object projected within the imaging range of said elemental lens into the elemental image corresponding to the elemental lens;

arranging all elemental images of said lenslet array into an array to obtain said elemental image array.

15. A control device of LED-based integral imaging display system matched with the control method of claim 14, comprising:

a parameter matching unit for performing the parameter matching step, and a video source acquisition unit for performing the video acquisition step.

16. A control device of LED-based integral imaging display system matched with the control method of claim 11, comprising:

a parameter matching unit for performing the parameter matching step, and a video source acquisition unit for performing the video acquisition step.

* * * * *